US009082235B2

(12) United States Patent
Lau et al.

(10) Patent No.: US 9,082,235 B2
(45) Date of Patent: Jul. 14, 2015

(54) USING FACIAL DATA FOR DEVICE AUTHENTICATION OR SUBJECT IDENTIFICATION

(75) Inventors: James Kai Yu Lau, Bellevue, WA (US); Ayman Kaheel, Bellevue, WA (US); Motaz El-Saban, Cairo (EG); Mohamed Shawky, Cairo (EG); Monica Gonzalez, Seattle, WA (US); Ahmed El Baz, Bellevue, WA (US); Tamer Deif, Cairo (EG); Alaa Abdel-Hakim Aly, Assiut (EG)

(73) Assignee: Microsoft Technology Licensing, LLC, Redmond, WA (US)

( * ) Notice: Subject to any disclaimer, the term of this patent is extended or adjusted under 35 U.S.C. 154(b) by 203 days.

(21) Appl. No.: 13/181,377

(22) Filed: Jul. 12, 2011

(65) Prior Publication Data
US 2013/0015946 A1 Jan. 17, 2013

(51) Int. Cl.
G06K 9/22 (2006.01)
G07C 9/00 (2006.01)
(Continued)

(52) U.S. Cl.
CPC ........ *G07C 9/00* (2013.01); *G06F 21/32* (2013.01); *G06K 9/00228* (2013.01);
(Continued)

(58) Field of Classification Search
CPC ............ G06K 9/2027; G06K 9/00221; G06K 9/00234; G06K 9/00241; G06K 9/00248; G06K 9/00261; G06K 9/00268; G06K 9/00275; G06K 9/00302; G06K 9/00308; G06K 9/00315; G06K 9/36; G06K 9/38; G06K 9/40; G06K 9/42; G06F 21/32; G06F 21/31; H04N 5/2354

USPC ........ 340/5.2, 5.3, 5.31, 5.53, 5.8, 5.81, 5.82, 340/5.83; 382/115, 118
See application file for complete search history.

(56) References Cited

U.S. PATENT DOCUMENTS 7,155,037 B2 12/2006 Nagai et al.
7,258,272 B2 8/2007 Yoshizane et al.
(Continued)

FOREIGN PATENT DOCUMENTS

JP 2005115481 A * 4/2005

OTHER PUBLICATIONS

Georghiades et al. (Georghiades, A.S.; Belhumeur, P.N.; Kriegman, D., "From few to many: illumination cone models for face recognition under variable lighting and pose," Pattern Analysis and Machine Intelligence, IEEE Transactions on, vol. 23, No. 6, pp. 643,660, Jun. 2001.*

(Continued)

*Primary Examiner* — Daniell L Negron
*Assistant Examiner* — Benyam Haile
(74) *Attorney, Agent, or Firm* — Bryan Webster; Kate Drakos; Micky Minhas

(57) ABSTRACT

Exemplary methods, apparatus, and systems are disclosed for authenticating a user to computing device. In one exemplary embodiment, an indication of a request by a user to unlock a mobile device in a locked state is received. One or more images of the face of the user are captured. Facial components of the user from the one or more captured images are extracted. A determination is made as to whether the user is an authorized user or a non-authorized user based at least in part on a comparison of the facial components of the user extracted from the one or more captured images to facial components of the authorized user from one or more authentication images of the authorized stored on the mobile device. If the user is determined to be the authorized user, the mobile device unlocked; otherwise, the mobile device is maintained in its locked state.

20 Claims, 15 Drawing Sheets

(51) Int. Cl.
*G06K 9/46* (2006.01)
*G06K 9/00* (2006.01)
*G06K 9/20* (2006.01)
*G06F 21/32* (2013.01)

(52) U.S. Cl.
CPC ....... *G06K 9/00248* (2013.01); *G06K 9/00275* (2013.01); *G06K 9/00281* (2013.01); *G06K 9/00302* (2013.01); *G06K 9/00315* (2013.01); *G06K 9/00335* (2013.01); *G06K 9/00899* (2013.01); *G06K 9/2027* (2013.01); *G06K 9/468* (2013.01); *G06K 9/4661* (2013.01)

(56) References Cited

U.S. PATENT DOCUMENTS

| | | | |
|---|---|---|---|
| 7,401,357 B2 | 7/2008 | Hasegawa et al. | |
| 7,634,103 B2 * | 12/2009 | Rubinstenn et al. | 382/100 |
| 7,643,671 B2 | 1/2010 | Dong et al. | |
| 8,194,938 B2 * | 6/2012 | Wechsler et al. | 382/118 |
| 8,336,765 B1 * | 12/2012 | Crews et al. | 235/379 |
| 2007/0009139 A1 * | 1/2007 | Landschaft et al. | 382/115 |
| 2007/0086626 A1 | 4/2007 | Mariani et al. | |
| 2009/0092294 A1 | 4/2009 | Uchida | |
| 2009/0110248 A1 | 4/2009 | Masuda et al. | |
| 2009/0251560 A1 * | 10/2009 | Azar et al. | 348/222.1 |
| 2009/0285454 A1 * | 11/2009 | Xu | 382/118 |
| 2010/0117949 A1 * | 5/2010 | Lai et al. | 345/102 |
| 2012/0075452 A1 * | 3/2012 | Ferren | 348/78 |

OTHER PUBLICATIONS

Manjunath et al. (Manjunath, B.S.; Chellappa, R.; Von der Malsburg, C., "A feature based approach to face recognition," Computer Vision and Pattern Recognition, 1992. Proceedings CVPR '92., 1992 IEEE Computer Society Conference on , vol., No., pp. 373,378, Jun. 15-18, 1992.*

"Animetrics releases facial recognition for mobile phones," 2 pp., downloaded from http://www.thirdfactor.com/2010/08/17/animetrics-releases-facial-recognition-for-mobile-phones (document marked Aug. 17, 2010).

"Facial Recognition Software for Mobile Phones," 2 pp., downloaded from http://www.cellular-news.com/story/39908.php, (document marked Oct. 5, 2009).

* cited by examiner

USING FACIAL DATA FOR DEVICE AUTHENTICATION OR SUBJECT IDENTIFICATION

FIELD

The present disclosure describes systems, methods, and apparatus for authenticating a user of a computing device (such as a mobile computing device) using facial data.

BACKGROUND

Mobile computing devices (such as smart phones, handheld computers, and tablet computers) are becoming increasingly more popular and offer an expanding array of capabilities. For example, today's mobile devices typically have the ability to remotely access the Internet, view a user's email accounts, capture images or video using built-in cameras, and store large amounts of user information. The user information may include, for example, personal information such as photos, files, and/or contact information. As a result of their compact design, mobile devices are often used in public environments and are more prone to being lost or stolen than their larger counterparts. Many mobile devices do not include a suitable mechanism for authenticating a user before allowing access to data or other functions offered by the device, making the user information on the mobile device vulnerable to misuse or theft. Furthermore, if an authentication mechanism is used on a mobile device, the mechanism typically comprises a password consisting of a small number of digits. Such an authentication mechanism is not robust, as the password can be easily observed or deduced given the relatively small number of possibilities.

SUMMARY

Exemplary embodiments of systems, methods, and apparatus for authenticating a user using facial data are described herein. In certain embodiments, facial recognition is performed by a computing device using data stored on the device. For example, embodiments of the disclosed facial recognition techniques can be used as a mechanism for recognizing a user of the mobile device as an authorized user and unlocking the mobile device without (or in combination with) a personal identification number input by the user.

The described techniques and tools can be implemented separately, or in various combinations with each other. As will be described more fully below, the described techniques and tools can be implemented on a variety of hardware devices having or being connected to an image capture device, including cell phones, smart phones, PDAs, handheld devices, handheld computers, touch screen tablet devices, tablet computers, entertainment consoles, or laptop computers.

In one exemplary embodiment disclosed herein, an indication of a request by a user to unlock a mobile device in a locked state is received. One or more images of the face of the user are captured. Facial components of the user are extracted from the one or more captured images. A determination is made as to whether the user is an authorized user based at least in part on a comparison of the facial components of the user extracted from the one or more captured images to facial components of the authorized user from one or more authentication images of the authorized user stored on the mobile device. The mobile device is unlocked if the user is determined to be the authorized user, but maintained in its locked state if the user is determined not to be the authorized user. In certain implementations, the one or more authentication images include a first authentication image of the authorized user in a first lighting condition and a second authentication image of the authorized user in a second lighting condition, the second lighting condition being different than the first light condition. In some implementations, the one or more authentication images include an authentication image of the authorized user where the face of the authorized user is illuminated primarily by a screen of the mobile device. In certain implementations, the act of capturing the one or more images includes prompting the user to make a facial expression or head motion, and the one or more authentication images include at least one authentication image of the user making the facial expression or head motion. In some implementations, the one or more captured images are pre-processed to compensate for lighting conditions in which the one or more images are captured (e.g., by performing one or more of white balancing, global exposure compensation, local exposure compensation, or downsampling of the one or more captured images). In certain implementations, the comparison is performed by generating feature descriptors representative of the facial components of the user in the one or more captured images and determining a difference between the feature descriptors of the user in the one or more captured images and respective facial descriptors of the authorized user generated from the one or more authentication images. In other implementations, the comparison is performed by generating a graph-based representation of the facial components of the user in the one or more captured images and determining a difference between the graph-based representation of the facial components of the user and respective graph-based representations of the authorized user generated from the one or more authentication images. In such implementations, the graph-based representation of the facial components of the user is indicative of appearances and relative geometric relationships of the facial components of the user. In some implementations, the act of determining whether the user is an authorized user comprises, if the facial components of the user extracted from the one or more captured images match the facial components of the authorized user from the one or more authentication images, generating an indication that the user is authorized; and, if the facial components of the user extracted from the one or more captured images do not match the facial components of the authorized user from the one or more authentication images, causing a secondary authentication method to be performed on the mobile device. In certain implementations, the act of capturing the one or more images of the face of the user comprises capturing two or more images of the face of the user in succession, and the act of determining whether the user is an authorized user comprises is based at least in part on a comparison of the facial components of the user extracted from the two or more captured images to the facial components of the authorized user from the two or more authentication images stored on the mobile device.

In another exemplary embodiment disclosed herein, an image of a user of a device is received. One or more facial descriptors of the user are identified from the received image. An evaluation is performed to determine whether the one or more identified facial descriptors of the user match one or more facial descriptors of a previous user extracted from multiple previously captured images of the previous user. In this embodiment, the multiple previously captured images of the previous user include at least one image of the previous user in a low-lighting condition. In certain implementations, the at least one image of the previous user in the low-lighting condition comprises an image of the user with light from a screen of the mobile device as the primary light source. In some implementations, an indication that the user in the received image is an authorized user or is not the authorized user is generated based at least in part on the evaluation. In certain implementations, a determination is made that the one or more facial descriptors of the user in the received image match the one or more facial descriptors of the previous user if a smallest difference between the facial descriptors of the user in the received image and the facial descriptors of the previous user from the multiple images of the previous user satisfies a threshold value. In some implementations, a determination is made that the one or more facial descriptors of the user in the received image match the one or more facial descriptors of the previous user if (a) a difference between the facial descriptors of the user in the received image and the facial descriptors of the previous user from a plurality of images of the authorized user satisfies a first threshold value, and (b) the number of images in the plurality of images satisfies a second threshold. In certain implementations, the evaluation is performed by evaluating whether the one or more identified facial descriptors of the user match one or more facial descriptors of multiple other previous users. In some implementations, a first of the facial descriptors is weighted higher than a second of the facial descriptors. In certain implementations, a determination is made that the one or more facial descriptors of the user in the received image match the one or more facial descriptors of the previous user if a smallest difference between the facial descriptors of the user in the received image and the facial descriptors of the previous user from the multiple images of the previous user satisfies a first threshold value, and if a ratio between the smallest distance and a greatest distance between the facial descriptors of the user in the received image and the facial descriptors of the previous user in the multiple images of the previous user satisfies a second threshold value. In some implementations, two or more images of the user of the device are received, an average of the one or more facial descriptors from the two or more images of the user is computed, and a determination is made that the one or more facial descriptors of the user match the one or more facial descriptors of the previous user if a difference between the average of the one or more facial descriptors and the facial descriptors of the previous user in at least one of the multiple images of the previous user satisfies a threshold value.

Another exemplary embodiment disclosed herein is a system comprising an image capturing device, a display device, a memory or storage device storing a program, and a processing unit operable to execute the program. In this exemplary embodiment, the execution of the program causes the processing unit to display a first image capture screen on the display device (the first image capture screen including a first prompt requesting that a first image of a user be captured in a first lighting condition), receive a first signal from the user to trigger the image capture device, capture the first image of the user with the image capture device in response to the first signal, display a second image capture screen on the display device (the second image capture screen including a second prompt requesting that a second image of the user be captured in a second lighting condition, the second lighting condition being different than the first lighting condition), receive a second signal from the user to trigger the image capture device, and capture the second image of the user with the image capture device in response to the second signal. In certain implementations, at least one of the first image capture screen or the second image screen prompts the user to make a facial expression during image capture.

This summary is provided to introduce a selection of concepts in a simplified form that is further described below. This summary is not intended to identify key features or essential features of the claimed subject matter, nor is it intended to be used as an aid in determining the scope of the claimed subject matter. Additional features and advantages of the disclosed technology will be made apparent from the following detailed description of embodiments that proceeds with reference to the accompanying drawings.

DETAILED DESCRIPTION

I. General Considerations

Figure 1:
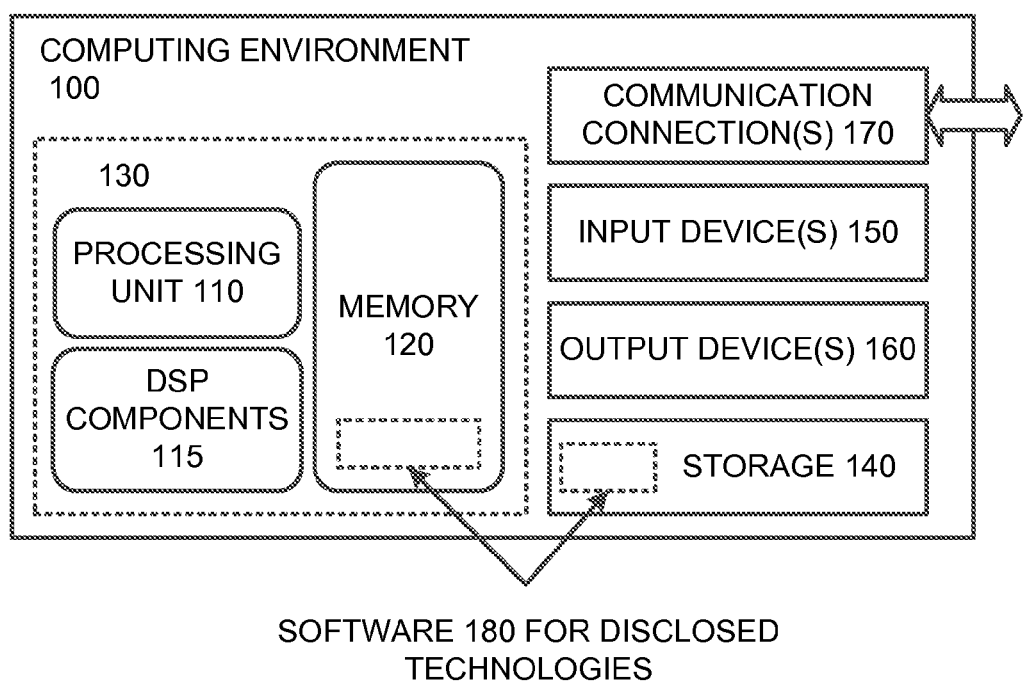
FIG. 1 is a schematic block diagram of an exemplary computing environment in which embodiments of the disclosed technology can be implemented.

Disclosed below are representative embodiments of methods, apparatus, and systems for using facial data to recognize the identity of a subject or to perform device authentication.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. Furthermore, any features or aspects of the disclosed embodiments can be used alone or in various combinations and subcombinations with one another. The disclosed methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods, apparatus, and systems can be used in conjunction with other methods, apparatus, and systems. Furthermore, as used herein, the term "and/or" means any one item or combination of items in the phrase.

Any of the disclosed methods can be implemented using software comprising computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components)) and executed on a computer (e.g., any suitable computer or image processor embedded in a device, such as a laptop computer, entertainment console, net book, web book, tablet computing device, smart phone, or other mobile computing device). Such software can be executed, for example, on a single local computer or in a network environment (e.g., via the Internet, a wide-area network, a local-area network, a client-server network (such as a cloud computing network), or other such network) using one or more network computers. Additionally, any of the intermediate or final data created and used during implementation of the disclosed methods or systems can also be stored on one or more computer-readable media (e.g., non-transitory computer-readable media) and are considered to be within the scope of the disclosed technology. Furthermore, any of the software-based embodiments can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, HTML5, or any other suitable programming language. Likewise, the disclosed technology is not limited to any particular computer or type of hardware. Exemplary computing environments suitable for performing any of the disclosed software-based methods are introduced below.

The disclosed methods can also be implemented using specialized computing hardware configured to perform any of the disclosed methods. For example, the disclosed methods can be implemented by an integrated circuit (e.g., an application specific integrated circuit ("ASIC") (such as an ASIC digital signal process unit ("DSP"), a graphics processing unit ("GPU"), or a programmable logic device ("PLD"), such as a field programmable gate array ("FPGA")) specially designed or configured to implement any of the disclosed methods.

The disclosed techniques can be used in a variety of usage and computation scenarios, including facial recognition or authentication performed on a mobile device, stand-alone desktop computer, network client computer, or server computer. Further, various parts of the disclosed facial recognition or authentication techniques can be performed in parallel or cooperatively on multiple computing devices, such as in a client/server, network "cloud" service, or peer computing arrangement, among others. Accordingly, it should be recognized that the techniques can be realized on a variety of different electronic and computing devices, including both end use consumer-operated devices as well as server computers that may provide the techniques as part of a service offered to customers.

A. Example Computing Environment

FIG. 1 illustrates a generalized example of a suitable computing device environment or computing hardware environment 100 in which embodiments of the disclosed technology can be implemented. The computing hardware environment 100 is not intended to suggest any limitation as to the scope of use or functionality of the disclosed technology, as the technology can be implemented in diverse general-purpose or special-purpose computing environments. The disclosed technology may also be practiced in distributed computing environments where tasks are performed by remote processing devices that are linked through a communications network (e.g., a cloud computing network). In a distributed computing environment, program modules may be located in both local and remote memory storage devices.

With reference to FIG. 1, the computing hardware environment 100 includes at least one processing unit 110 and memory 120. In FIG. 1, this most basic configuration 130 is included within a dashed line. The processing unit 110 executes computer-executable instructions. In a multi-processor system, multiple processing units execute computer-executable instructions to increase processing power. The memory 120 can be volatile memory (e.g., registers, cache, RAM, DRAM, SRAM), non-volatile memory (e.g., ROM, EEPROM, flash memory), or some combination of the two. The memory 120 can store software 180 for implementing one or more of the facial recognition and/or user authentication techniques disclosed herein. For example, the memory 120 can store software 180 for implementing any of the disclosed methods.

In addition to the central processing unit 110, the computing environment can include other processing resources, such as digital signal processing DSP or multimedia components 115. The DSP components 115 can include resources that can be used as part of the facial recognition and/or user authentication techniques disclosed herein. For example, the DSP components can include multimedia DSP ASIC units, GPU shader units, a multicore CPU, advanced multimedia instruction sets for the CPU, or the like.

The computing hardware environment can have additional features. For example, the computing hardware environment 100 includes a storage device 140, one or more input devices 150, one or more output devices 160, and one or more communication connections 170. An interconnection mechanism (not shown) such as a bus, controller, or network interconnects the components of the computing hardware environment 100. Typically, operating system software (not shown) provides an operating environment for other software executing in the computing hardware environment 100, and coordinates activities of the components of the computing hardware environment 100.

The storage device 140 is a type of non-volatile memory and can be removable or non-removable. The storage device 140 includes, for instance, non-transitory computer readable media such as magnetic disks (e.g., hard drives), magnetic tapes or cassettes, optical storage media (e.g., CD-ROMs or DVDs), or any other tangible non-transitory storage medium that can be used to store information and which can be accessed within or by the computing hardware environment 100. The storage device 140 can also store the software 180 for implementing any of the described techniques.

The input device(s) 150 can be a touch input device such as a keyboard, mouse, touch screen, pen, trackball, a voice input device, a scanning device, or another device that provides input to the computing environment 100 (e.g., an image capturing device). The output device(s) 160 can be a display device, touch screen, printer, speaker, or another device that provides output from the computing environment 100. Further, any of the input or output devices can include embedded components that operate or otherwise use embedded software.

The communication connection(s) 170 enable communication over a communication medium to another computing entity. The communication medium conveys information such as computer-executable instructions, any of the intermediate or final messages or data used in implementing embodiments of the disclosed technology. By way of example, and not limitation, communication media include wired or wireless techniques implemented with an electrical, optical, RF, infrared, acoustic, or other carrier.

The various methods disclosed herein (e.g., any of the disclosed facial recognition and/or user authentication techniques) can be described in the general context of computer-executable instructions stored on one or more computer-readable storage media (e.g., tangible non-transitory computer-readable storage media such as memory 120 and storage 140). As should be readily understood, the terms computer-readable storage media or non-transitory computer-readable media include the media for storage of data and program instructions such as memory 120 and storage 140, and not modulated data signals alone.

The various methods disclosed herein can also be described in the general context of computer-executable instructions, such as those included in program modules, being executed by a processor in a computing environment. Generally, program modules include routines, programs, libraries, objects, classes, components, data structures, and other such software elements that perform particular tasks or implement particular abstract data types. The functionality of the program modules may be combined or split between program modules as desired in various embodiments. Any of the disclosed methods can also be performed using a distributed computing environment (e.g., a client-server network, cloud computing environment, wide area network, or local area network).

Further, the facial recognition and/or user authentication embodiments disclosed herein can be implemented either as a separate, stand-alone application or integrated with the operating system of the computing device. For example, any of the disclosed embodiments can be implemented as part of the login authentication system controlled by the operating system.

B. Example Mobile Device

Figure 2:
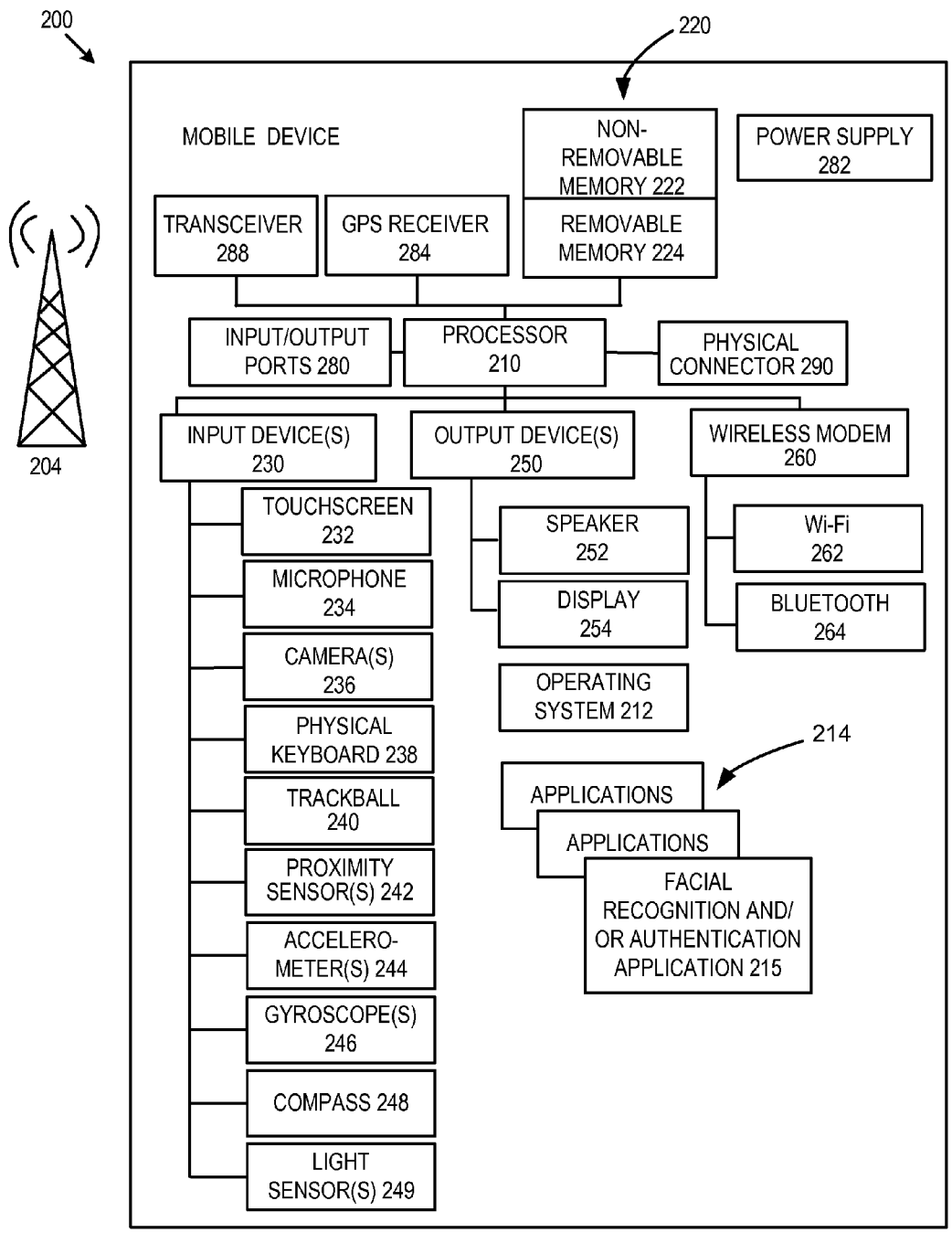
FIG. 2 is a schematic block diagram of an exemplary mobile device environment in which embodiments of the disclosed technology can be implemented.

FIG. 2 is a schematic block diagram depicting a detailed example of a mobile computing device 200 capable of implementing the techniques and solutions described herein. The mobile device 200 includes a variety of optional hardware and software components. In general, a component in the mobile device can communicate with any other component of the device, although not all connections are shown, for ease of illustration. The mobile device can be any of a variety of computing devices (e.g., cell phone, smartphone, handheld computer, laptop computer, notebook computer, tablet device, netbook, media player, Personal Digital Assistant ("PDA"), camera, video camera, or other such devices) and can allow wireless two-way communications with one or more mobile communications networks 204, such as a Wi-Fi, cellular, or satellite network.

The illustrated mobile device 200 includes a controller or processor 210 (e.g., signal processor, microprocessor, ASIC, or other control and processing logic circuitry) for performing such tasks as signal coding, data processing, input/output processing, power control, and/or other functions. An operating system 212 controls the allocation and usage of the components and support for one or more application programs 214, such as a facial recognition and/or user authentication tool 215 that implements one or more of the innovative features described herein. The application programs can further include common mobile computing applications (e.g., telephony applications, email applications, calendars, contact managers, web browsers, messaging applications), or any other computing application.

The illustrated mobile device 200 includes memory 220. Memory 220 can include non-removable memory 222 and/or removable memory 224. The non-removable memory 222 can include RAM, ROM, flash memory, a hard disk, or other well-known memory storage technologies. The removable memory 224 can include flash memory or a Subscriber Identity Module ("SIM") card, which is well known in Global System for Mobile Communications ("GSM") communication systems, or other well-known memory storage technologies, such as "smart cards." The memory 220 can be used for storing data and/or code for running the operating system 212 and the applications 214. Example data can include web pages, text, images, sound files, video data, or other data sets to be sent to and/or received from one or more network servers or other devices via one or more wired or wireless networks. The memory 220 can be used to store a subscriber identifier, such as an International Mobile Subscriber Identity ("IMSI"), and an equipment identifier, such as an International Mobile Equipment Identifier ("IMEI"). Such identifiers can be transmitted to a network server to identify users and equipment.

The mobile device 200 can support one or more input devices 230, such as a touch screen 232 (e.g., capable of capturing finger tap inputs, finger gesture inputs, or keystroke inputs for a virtual keyboard or keypad), microphone 234 (e.g., capable of capturing voice input), one or more cameras 236 (e.g., capable of capturing still pictures and/or video images), physical keyboard 238, trackball 240, one or more proximity sensors 242, one or more accelerometers 244, one or more gyroscopes 246, compass 248, one or more light sensors 249, and/or buttons. The mobile device 200 can further support one or more output devices 250, such as a speaker 252 and a display 254. Other possible output devices (not shown) can include piezoelectric or other haptic output devices. Some devices can serve more than one input/output function. For example, touchscreen 232 and display 254 can be combined in a single input/output device.

The mobile device 200 can provide one or more natural user interfaces ("NUIs"). For example, the operating system 212 or applications 214 can comprise speech-recognition software as part of a voice user interface that allows a user to operate the device 200 via voice commands.

A wireless modem 260 can be coupled to one or more antennas (e.g., transceiver 288) and can support two-way communications between the processor 210 and external devices, as is well understood in the art. The modem 260 is shown generically and can include, for example, a cellular modem for communicating at long range with the mobile communication network 204, a Bluetooth-compatible modem 264, or a Wi-Fi-compatible modem 262 for communicating at short range with an external Bluetooth-equipped device or a local wireless data network or router. The wireless modem 260 is typically configured for communication with one or more cellular networks, such as a GSM network for data and voice communications within a single cellular network, between cellular networks, or between the mobile device and a public switched telephone network ("PSTN").

The mobile device can further include at least one input/output port 280, a power supply 282, a satellite navigation system receiver 284, such as a Global Positioning System ("GPS") receiver, a transceiver 288 (for wirelessly transmitting analog or digital signals) and/or a physical connector 290, which can be a USB port, IEEE 1394 (FireWire) port, and/or RS-232 port. The illustrated components are not required or all-inclusive, as any of the components shown can be deleted and other components can be added.

The mobile device 200 can be part of an implementation environment in which various types of services (e.g., computing services) are provided by a computing "cloud." For example, the cloud can comprise a collection of computing devices, which may be located centrally or distributed, that provide cloud-based services to various types of users and devices connected via a network such as the Internet. Some tasks (e.g., processing user input and presenting a user interface) can be performed on local computing devices (e.g., connected devices) while other tasks (e.g., performing facial recognition for an image transmitted from the local computing device) can be performed in the cloud.

Although FIG. 2 illustrates a mobile device 200, more generally, the techniques and solutions described herein can be implemented with devices having other screen or image capturing capabilities, such as a desktop computer, a television screen, or device connected to a television (e.g., a set-top box, gaming console, or sensor connected to a gaming console). Services can be provided by the cloud through service providers or through other providers of online services. Thus, the facial recognition or authentication techniques and solutions described herein can be implemented with any of the connected devices as a client computing device. Similarly, any of various computing devices in the cloud or a service provider can perform the role of server computing device and deliver authentication or other data to the connected devices.

Figure 3A:
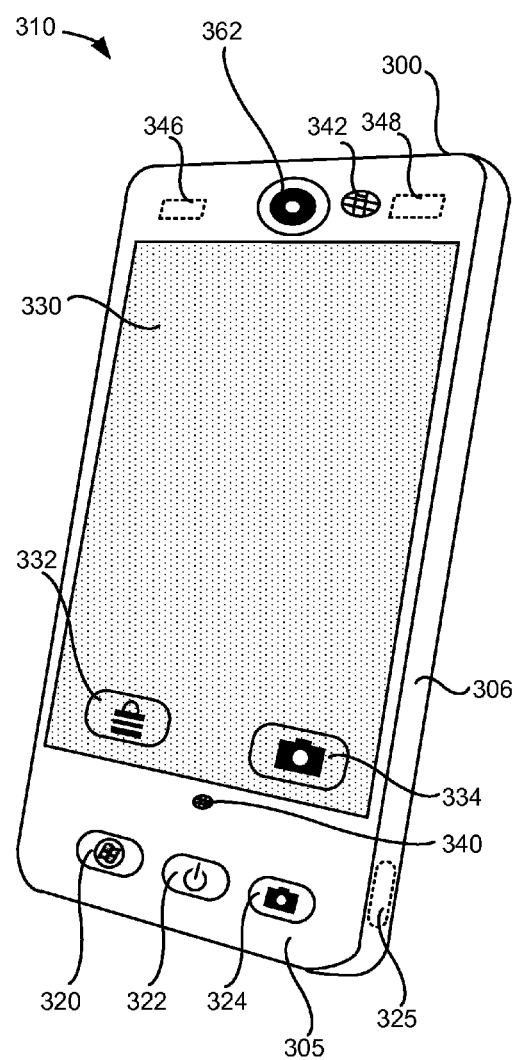
FIGS. 3A and 3B illustrate a generalized example of a mobile device suitable for implementing embodiments of the disclosed technology.
Figure 3B:
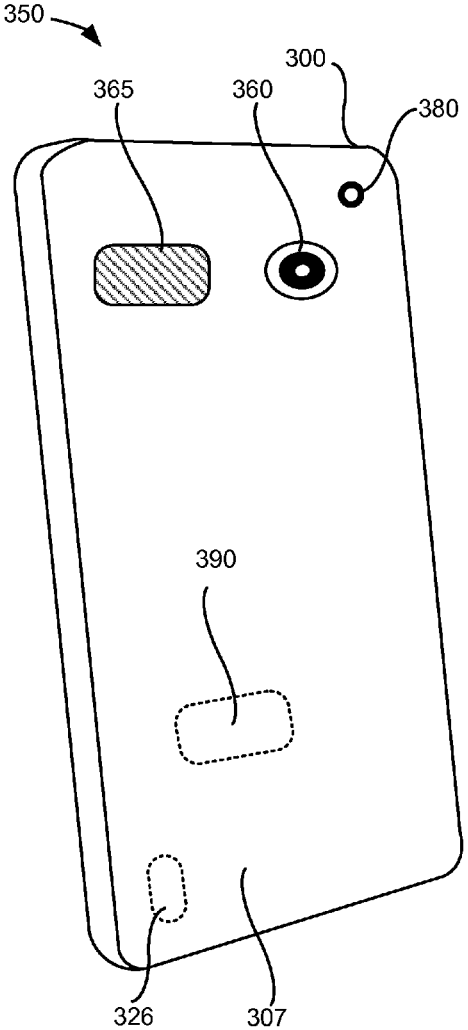

FIG. 3A depicts a front view 310 of the body of an example mobile device 300, while FIG. 3B depicts a rear view 350 of the mobile device. As shown, the mobile device 300 includes several hardware buttons, including a home button 320, a power button 322, and a camera shutter (image-capture) button 324. Also depicted is a touch screen display 330, which is shown displaying a touch screen unlock button 332, and a touch screen camera shutter button 334.

The mobile device 300 includes a microphone 340 and speaker 342, along with two proximity sensors 346 and 348, situated below the surface of the mobile device. In some examples, a single, or three or more, proximity sensors can be used. Any suitable proximity sensor(s) can be employed. In some examples, the proximity sensors 346 and 348 emit an infrared beam and receive a reflected infrared beam, which is reflected off the surface of a nearby object that has been illuminated by the emitted infrared beam. An intensity measurement, or other measured property for the received beam, can be used to determine whether an object is in proximity with the mobile device 300.

The front face of the example mobile device 300 further includes a front camera 362. The camera 362 can be used to capture images with an image sensor embedded in the device 300 behind a lens. The image sensor can comprise, for example, a CMOS-based sensor, CCD (charge-coupled device) sensor, or other suitable technology.

In certain embodiments, the camera shutter button 324 of the mobile device 300 is a dedicated dual-action camera shutter button, with the ability to detect "half-press" and "full-press" as distinct, separate actions. As is readily understood to those of skill in the art, a half-press refers to the partial actuation of a button or other control, while a full-press refers to a further actuation of the button or control past a determined limit. In some examples, the dual action camera shutter button 324 is associated with the following attributes. When a half-press is detected, input data is received with the mobile device that is associated with auto-focus functionality. When a full-press is detected, input data is received that is associated with camera invocation and image capture. Various button debounce times can be used for detecting a full-press, a half-press, or both. In other examples, a single-action camera button can be used.

While the camera shutter button 324 is shown located on a front surface 305 of the mobile device 300, in other examples, a camera shutter button can be positioned at alternate locations. For example, the camera shutter button 324 can be located at location 325 (on a side surface 306) or location 326 (on a rear surface 307), respectively, of the mobile device.

Turning to the rear view 350 shown in FIG. 3B, the example mobile device 300 includes a rear camera lens 360 and an electronic flash 365. In some examples, there is no flash present in the mobile device 300. The rear camera 360 can be configured to capture an image with an image sensor embedded in the device behind a lens. The image sensor can be, for example, a CMOS-based sensor, CCD (charge-coupled device) sensor, or other suitable technology. In some examples, the image sensor coupled with the camera lens 360 is also used as a light sensor to detect an object in proximity with the mobile device 300. In some examples, a photodiode 380 can be used as a light sensor instead of a camera image sensor. In some examples, signals from the proximity sensors 346 and 348, and/or the touch screen display 330 are combined with signals from a light sensor (e.g., an image sensor coupled with camera lens 360 and/or a photodiode 380) in order to determine objects in proximity with the mobile device 300 with improved accuracy.

The individual components (e.g., the hardware buttons 320, 322, and 324, microphone 340, speaker 342, touch screen display 330, camera lens 360 and flash 365) can be coupled to a mobile device chassis (not shown), which is connected to internal components of the mobile device 300, for example: one or more processors, a piezoelectric actuator, a power supply, and a modem.

In other examples, the camera shutter button 324 can be moved to other suitable positions, for example, locations 325 or 326. It is also desirable that the camera shutter button 324 and/or power button 322 be positioned to avoid accidental actuation, in order to mitigate the chance that an image capture application will be launched inadvertently. Furthermore, the front camera 362 and associated image capture device can be activated using a separate camera shutter button from the rear camera 360 and its associated image capture device. For example, the touchscreen camera shutter button 334 can be used to activate the image capture device associated with the front camera 362, whereas a separate shutter button (e.g., shutter button 324, 325, 326) can be used to activate the image capture device associated with the rear camera lens 360. For instance, the touch screen camera shutter button 334 may be presented to the user on device startup when the user is prompted to authenticate his or her identity for accessing the device.

Another desirable aspect of the placement of the camera shutter button 324 is for the button to be positioned such that a user can easily actuate the button without covering the camera 360 or one or more of the proximity sensors 346 and 348. For example, as shown in FIG. 3A, the proximity sensors 346 and 348 and photodiode 380 are positioned at a location where a user's fingers are less likely to be nearby the proximity sensors when actuating the camera shutter button 324.

As shown, software 390 for implementing embodiments of the described techniques can be stored on computer-readable storage media in the mobile device 300.

C. Example Network Environment

Figure 4:
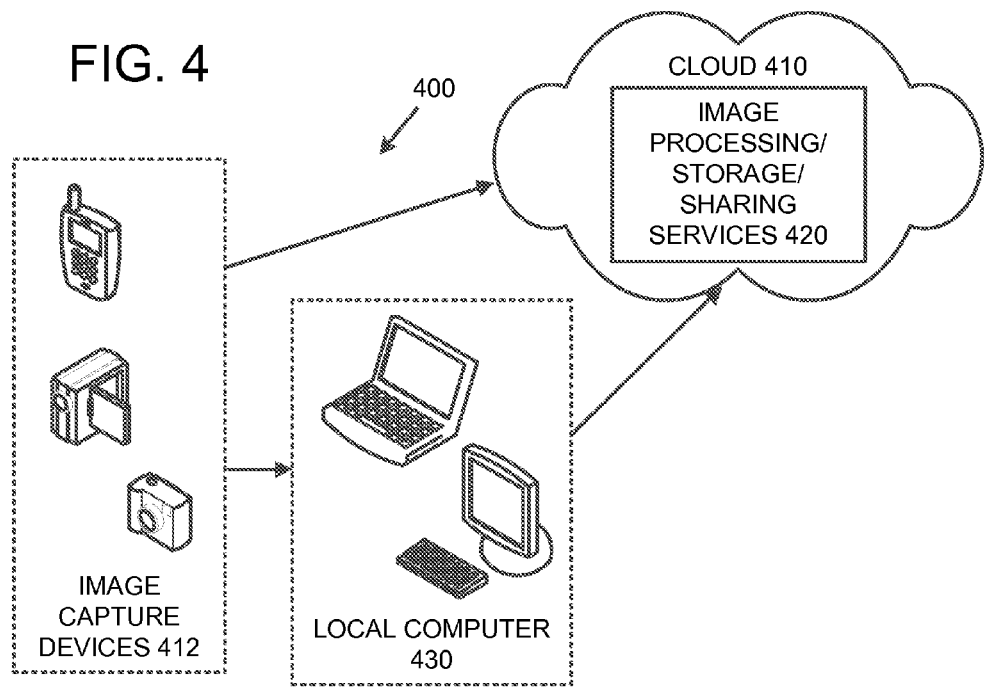
FIGS. 4 and 5 are schematic block diagrams illustrating generalized examples of suitable implementation environments in which one or more aspects of the disclosed techniques are performed by a computing cloud coupled to a computing device.
Figure 5:
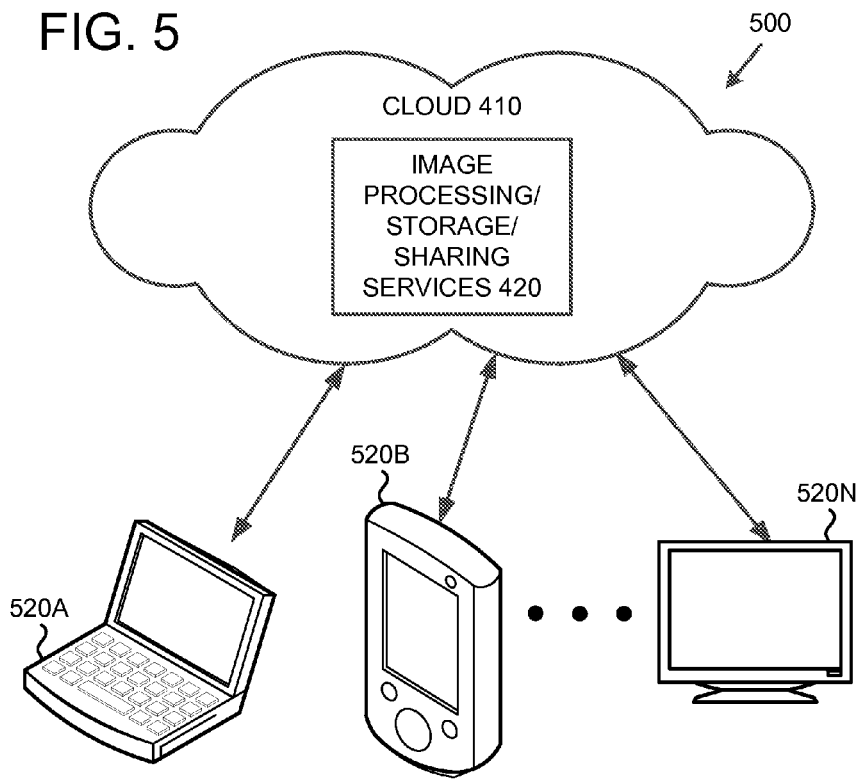

FIGS. 4 and 5 illustrate generalized examples of networking environments 400 and 500 for cloud computing in which the facial recognition and/or authentication techniques described herein can be practiced. In example environment 400, the cloud 410 provides services 420 (such as facial recognition, user authentication, or social networking services, among other examples) for user computing devices. Services can be provided in the cloud 410 through cloud computing service providers, or through other providers of online services. For example, the cloud-based services 420 can include an image processing service that uses any of the disclosed facial recognition techniques disclosed herein, an image storage service, an image sharing site, a social networking site, or other services via which user-sourced images are generated, stored, and distributed to connected devices.

The user may use various image capture devices 412 to capture one or more images. The user can upload the one or more digital images to the service 420 on the cloud 410 either directly (e.g., using a data transmission service of a telecommunications network) or by first transferring the one or more images to a local computer 430, such as a laptop, personal computer, or other network connected computing device.

As shown in example environment 500 in FIG. 5, cloud 410 can also be used to provide services that include embodiments of the disclosed facial recognition and/or user authentication techniques to connected computer devices that have a variety of screen display sizes 520A-N. Connected device 520A represents a device with a mid-size display screen, such as may be available on a personal computer, a laptop, a tablet, or other like network-connected device. Connected device 520B represents a device with a display screen configured to be highly portable (e.g., a small size screen). For example, connected device 520B could be a smart phone, personal digital assistant, tablet computer, or the like. Connected device 520N represents a connected device with a large viewing screen. For example, connected device 520N could be a television screen (e.g., a smart television) or another device that provides image output to a television or an image projector (e.g., a set-top box or gaming console), or other devices with like image display output. The connected devices 520A-N can further include image-capturing hardware. For example, the connected device 520B can be a mobile device with one or more image sensors, and the connected device 520N can be a television coupled to an entertainment console having an accessory that includes one or more image sensors.

In the illustrated cloud-computing network environments 400 and 500, any of the techniques disclosed herein can be implemented at least in part by cloud 410. In one example scenario, an embodiment of the disclosed facial recognition and/or user authentication techniques is implemented in software on the local computer 430, one of the local image capture devices 412 (e.g., smart phone, personal digital assistant, tablet computer, or the like), or connected devices 520A-N by using authentication images from the cloud-based service. In another scenario, an embodiment of the disclosed facial recognition technique is implemented in the cloud, and applied to images as they are uploaded to and stored in the cloud. In this scenario, the facial recognition can be performed using images stored in the cloud as well. In still other scenarios, an image of an unauthenticated user is captured by one of the local image capture devices 412 or connected devices 520A-N equipped with image-capturing hardware and transmitted to the cloud. The cloud then performs a facial recognition and/or user authentication technique using an embodiment of the disclosed technology and transmits data to the device indicating whether the unauthenticated user is authenticated as an authorized user (e.g., as an authorized user of one or more of the connected devices 520A-N).

II. Authenticating a Device User Using Facial Data

Figure 6:
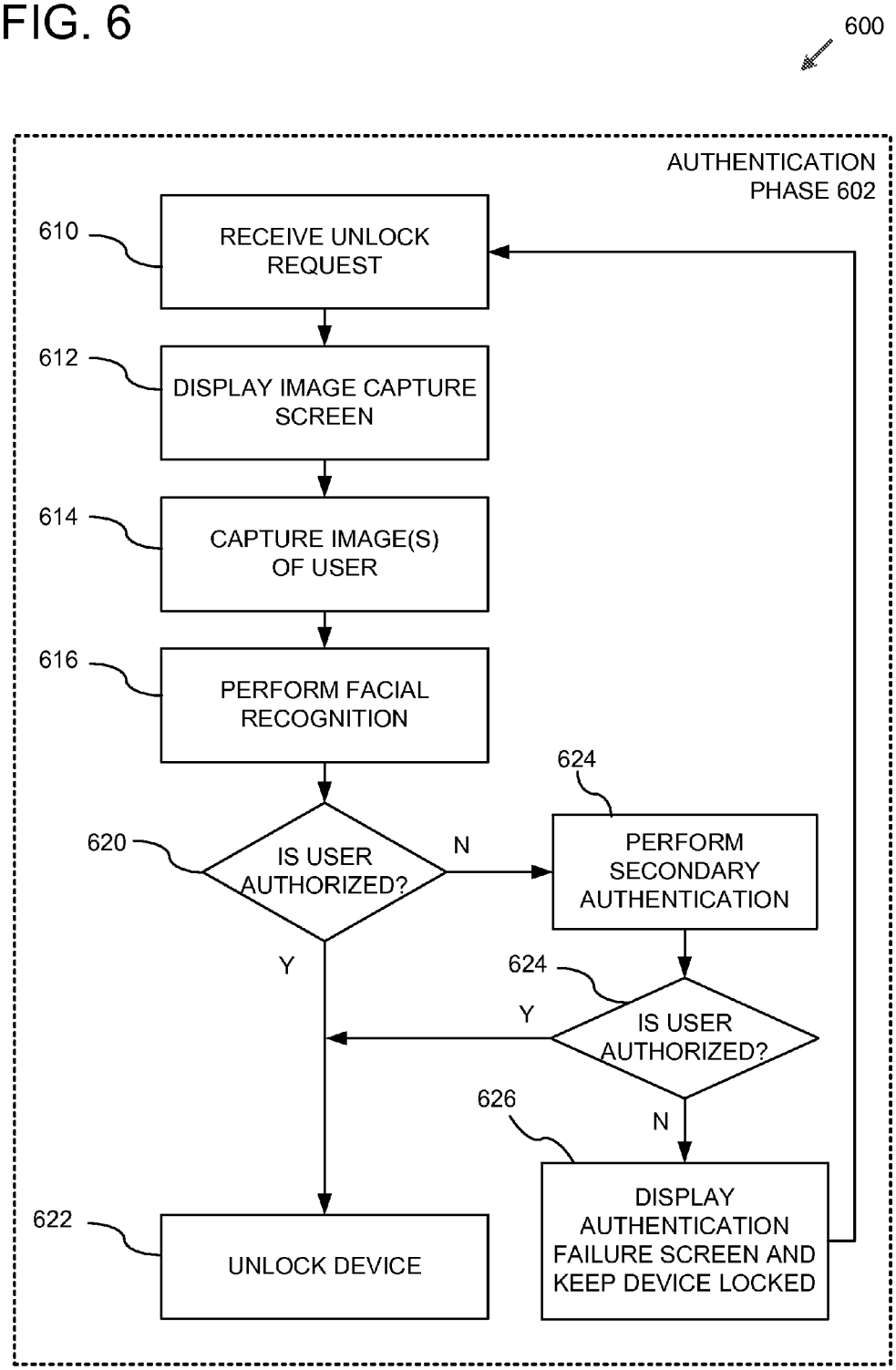
FIG. 6 is a flowchart of an exemplary method for authenticating a user to a computing device, such as a mobile device, according to embodiments of the disclosed technology.

FIG. 6 is a flowchart illustrating an exemplary method 600 for authenticating the user of a device using facial data. In particular, the method 600 can be performed to determine whether a user is authorized to unlock the device from a locked state, thereby granting the user access to one or more applications and/or data stored on the device. The exemplary method will be described below in the context of a mobile device, such as a smart phone. It is to be understood, however, that the method can be applied in other contexts as well and used to unlock or provide access to certain categories of applications or data stored or accessed by any of the computing devices described above. For example, the exemplary authentication method can be performed using an image sensor attached to an entertainment console or television to determine whether the user is authorized to use the device or access certain games or programming.

In the illustrated embodiment, the exemplary method 600 is performed in an authentication phase 602 that uses images of the authorized user previously captured during an enrollment phase. Examples of a suitable enrollment phase are described below with respect to FIG. 11.

At 610, a request to unlock the device is received. The unlock request can have a variety of forms. Typically, the unlock request is triggered by a button on the device being depressed while the device is in a standby state (e.g., one of the buttons 320, 322, 324, 325) or by user interaction with a touch screen of the device. In some embodiments, however, the unlock request is triggered by data from the accelerometer and/or gyroscope of the device indicating that the device is being moved back and forth (e.g., in a shaking motion). Further, in certain embodiments, the unlock request is triggered by data from the accelerometer and/or gyroscope indicating that the device is being held up in a vertical orientation. This position provides an indication that the device is about to be used by a user and can trigger an unlock request.

At 612, an image capture screen is displayed to the user. The image capture screen can, for example, facilitate capturing of the image of the user that is used for determining whether the user is authorized to access the device. The image capture screen can show the current image being captured by a camera of the device and allow the user to adjust either his or her position relative to the camera, or the camera's position relative to the user. The image capture screen can further include a touch screen button that causes the device to capture, process, and store the current image.

At 614, one or more images of the user of the device are captured. For example, in particular embodiments, the camera of the device and its associated processing hardware can be triggered by the user to capture and store a current image. The image of the user can be captured from either a rear camera or a front camera of the device. In particular embodiments, the front camera of the device is used so that the image to be captured can be previewed on a display screen (e.g., a touchscreen).

FIGS. 7-10 illustrate various examples of image capture screens as can be displayed at 612 and associated image capture techniques as can be used at 614. Any of the elements of the disclosed screens and/or techniques can be used alone or in various combinations and subcombinations with one another.

Figure 7:
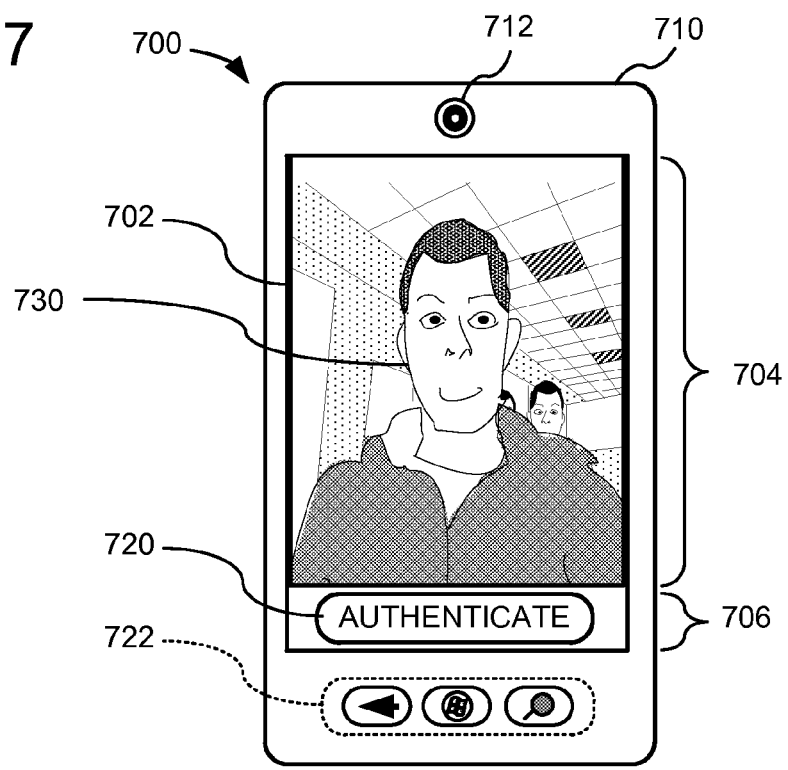
FIG. 7 illustrates a first example image capture screen according to embodiments of the disclosed technology.

FIG. 7 is a schematic block diagram 700 illustrating one example image capture screen 702 on a mobile device 710. In FIG. 7, the image capture screen 702 is displayed on the touch screen of the device and includes a portion 704 showing the current image being captured by a lens and camera 712 of the device. In the illustrated embodiment, the camera 712 is a front facing camera, thereby allowing the user to simultaneously view and be the subject of the image. The image capture screen 702 further includes a portion 706 that implements a touch screen button 720 for causing the current image to be captured, processed, and used for authentication processing. In practice, the user can tap the touch screen button when the user's face 730 is within the frame shown by the portion 704. Other buttons can also be used as the shutter button for triggering the capturing and use of the current image (e.g., any of buttons 722 or other physical or touch screen buttons on the device).

In certain embodiments, the user can be directed into a particular facial orientation and/or facial expression (e.g., by a prompt on the image capture screen 702) or can select a an orientation and/or expression in order to produce an image of the user in a particular orientation with a particular expression (e.g., a side view, a front view, a smiling expression, a frowning expression, a stern expression, or any other such facial orientation or expression). In certain implementations, the facial expression can be a non-typical expression (e.g., an expression other than a smile or a relaxed expression). For instance, the facial expression can be a wink, an open-mouth expression, puffed-cheek expression, angry expression, a both-eyes-closed expression, a tongue-out expression, or any other such non-typical expression. The facial orientation and/or facial expression can be used to provide an additional layer of security. In particular, the facial recognition process described below can identify whether the captured image is of a person in the expected orientation and with the expected expression, and thereby use orientation and/or expression as an additional criterion for determining whether the user is authorized to use the device. Further, in certain implementations, the face recognition process can help differentiate whether the captured image is of a live person or of an image, video, or model of a real person.

Figure 8:
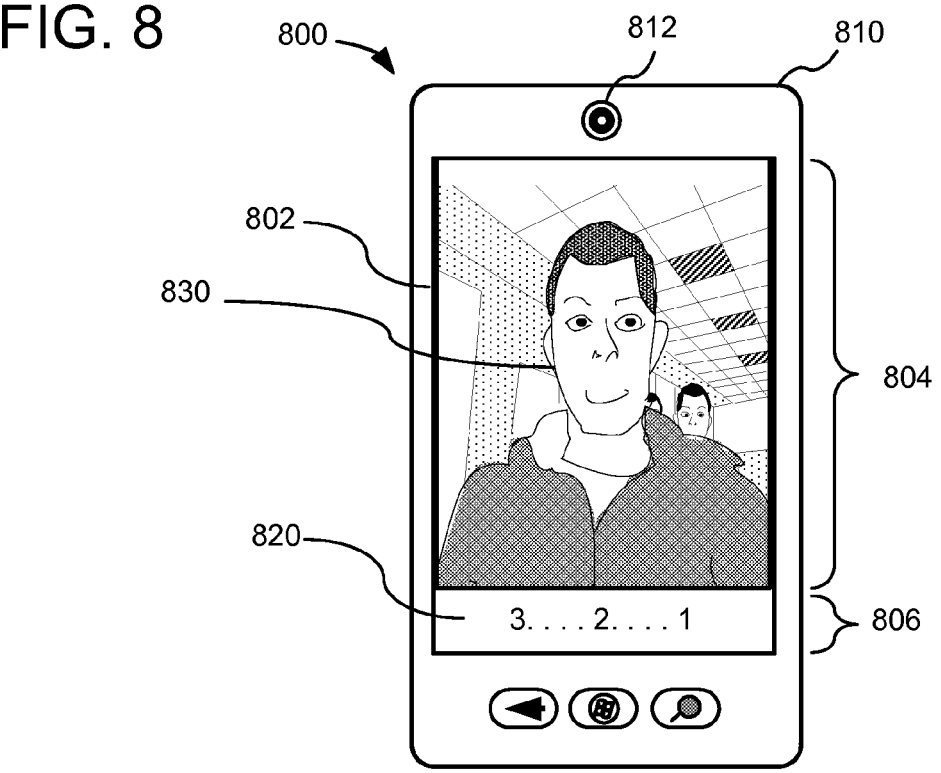
FIG. 8 illustrates a second example image capture screen according to embodiments of the disclosed technology.

FIG. 8 is a schematic block diagram 800 illustrating another example image capture screen 802 on a mobile device 810. In FIG. 8, the image capturing is automatically performed. In particular, in the illustrated embodiment, a timer is used to trigger the capturing, processing, and storing for use as the authentication image. As with in FIG. 7, the image capture screen 802 includes a portion 804 showing the current image being captured by a camera 812 of the device. The image capture screen 802 further includes a portion 806 that displays a countdown or other image indicating when the image will be captured and used (e.g., an incrementing bar, a blinking icon, a stopwatch image, or other such images). When the timer expires, the device captures, processes, and stores the current image for authentication processing. The timer may repeat one or more times in order to get multiple image samples, or may repeat in the event that authentication fails. The number of images taken for authentication purposes within a certain period of time, however, can be capped at a preset or user-selected maximum number.

Figure 9A:
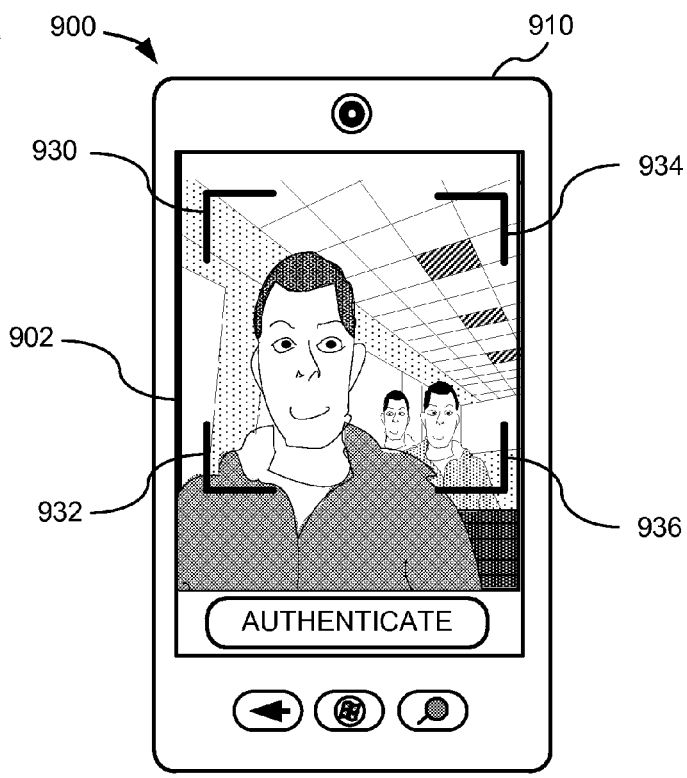
FIGS. 9A and 9B illustrate third and fourth example image capture screens according to embodiments of the disclosed technology.
Figure 9B:
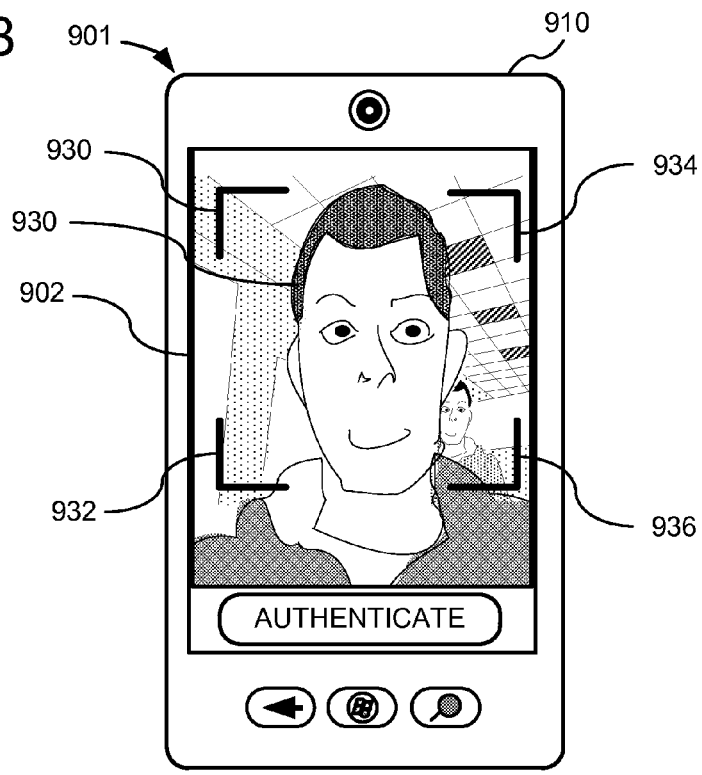

FIGS. 9A and 9B are schematic block diagrams 900, 901 illustrating another example image capture screen 902 on a mobile device 910. In FIG. 9A, the image capture screen 902 displays frame corners 930, 932, 934, 936 for indicating to the user how to frame his or her face within the image capture screen in order to achieve improved authentication accuracy and speed. In FIG. 9A, the user's face is too small within the frame corners 930, 932, 934, 936, and is offset from the frame defined by the frame corners. Thus, by using the visual feedback from the frame corners 930, 932, 934, 936 displayed on the image capture screen 902, the user can move the mobile device closer to his or her face and center the device so that his or her face is aligned with the frame corners. Block diagram 901 in FIG. 9B illustrates the user's face 930 after being aligned and scaled within the frame corners 930, 932, 934, 936. In block diagram 902, the user's face is ready for image capture and use as an image to be authenticated. Although the image from block diagram 900 in FIG. 9A can be used for authentication using appropriate processing that aligns and rescales the user's face, the use of the frame corners 930, 932, 934, 936 can produce images that can be more quickly and reliably processed for authentication.

In other embodiments, the user is prompted to select the face in a captured image for which authentication is to be performed. For example, two or more faces can be captured in an image, and the user can indicate (e.g., by tapping a corresponding location on a touch screen) which of the faces should be used for authentication purposes.

Figure 10:
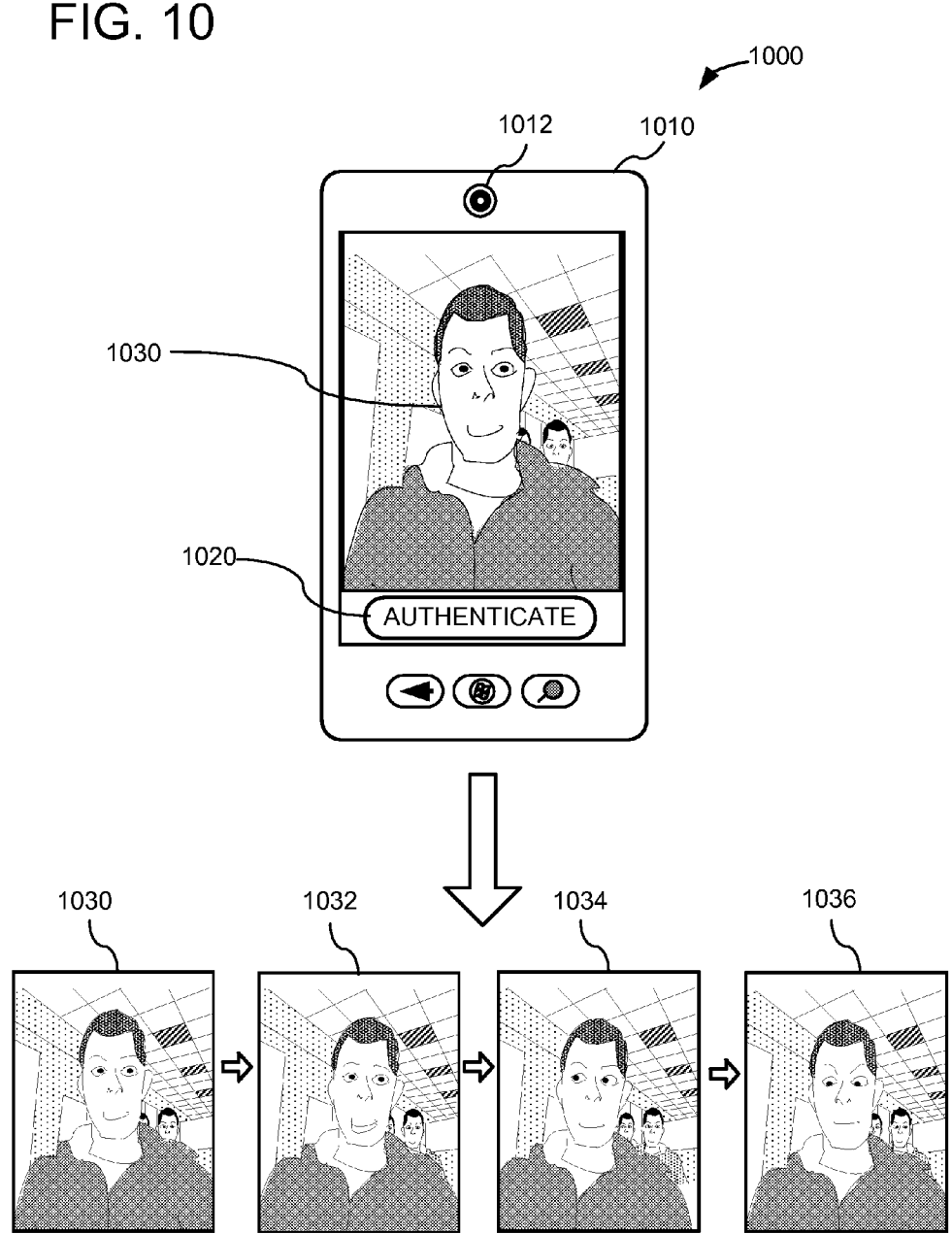
FIG. 10 illustrates a fifth example image capture screen in which multiple images are captured according to embodiments of the disclosed technology.

FIG. 10 is a schematic block diagram 1000 illustrating another example image capture method as can be used in embodiments of the disclosed technology. In FIG. 10, multiple images 1030, 1032, 1034, 1036 of a user 1030 are captured by a camera 1012 of a mobile device 1010 upon activation of touch screen button 1020 (or other button) used to trigger the authentication process. In other embodiments, multiple images can also be captured upon expiration of a timer as in any of the embodiments described above with respect to FIG. 8. In particular embodiments, the series of images is automatically captured once the authentication process begins. For example, the images can be captured in rapid succession at fixed time intervals between images. The number of images captured can vary from implementation to implementation (e.g., between 2 and 10). In other embodiments, the user is prompted to trigger the capturing of multiple additional images through the image capture screen 1002. In the illustrated embodiment, the user is naturally changing and adjusting his position, facial expression, focus, and so on. In other embodiments, however, the user can be directed into different positions or facial expressions (e.g., by prompts on the image capture screen 1002) in order to produce a series of images with expected facial orientations and expressions (e.g., a side view, a front view, a smiling expression, a frowning expression, a stern expression, or any other such facial orientation or expression). The series of images can then be analyzed during the facial recognition process described below. The additional images in the set provide additional data points that can help the overall effectiveness of the facial recognition process by increasing the probability that the captured images are sufficient to properly identify the subject and by decreasing the likelihood of false positives. Furthermore, in embodiments in which a specific facial expression or facial orientation is captured in the one or more additional image, the additional images provide unique data points that will be matched to different (independent) reference images than one or more of the other captured images.

Figure 17:
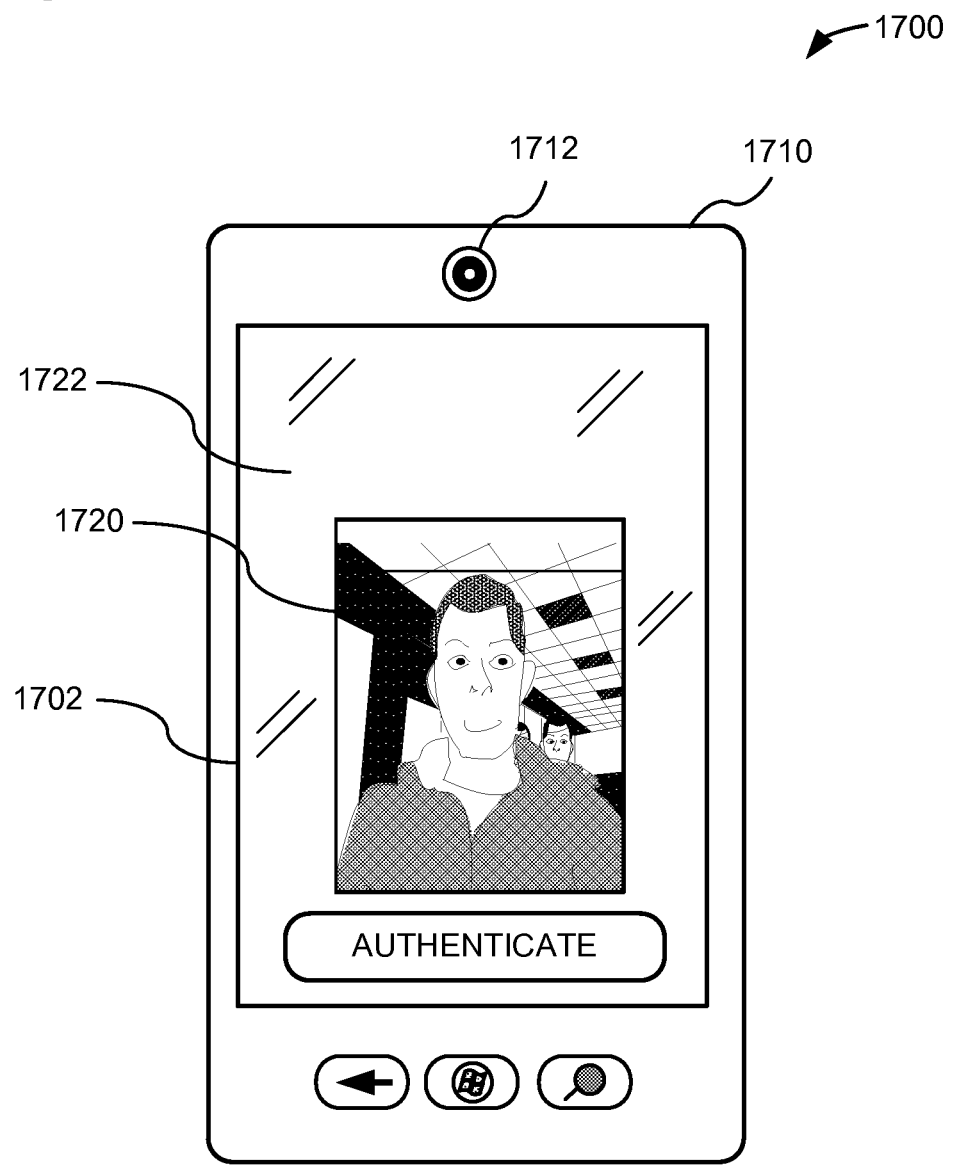
FIG. 17 illustrates another example image capture screen according to embodiments of the disclosed technology.

In any of the example image capture screens and methods described above with respect to FIGS. 7-10, additional lighting can be provided by the mobile device itself to help illuminate the user when the image capture occurs in dark or poorly lit environments (e.g., at a night, in a dark restaurant, in a night club, in a car at night, and the like). The additional lighting can be activated when a light sensor of the mobile device senses that the lighting levels fall below a certain threshold level. The lighting itself can be provided by a light (or flash) mounted on the mobile device. For instance, the mobile device can be equipped with a light or flash on the front-facing side of the device. Or, in some embodiments, the flash on the rear-side is triggered, even though the front-facing camera is capturing the image. Further, in particular embodiments, the touch screen itself momentarily provides additional lighting for the image capture process. For example, when the image is being captured, the screen can display all white or near-white pixel values with high brightness levels. For example, FIG. 17 is a schematic block diagram 1700 of an exemplary image capture screen 1702 of a mobile device 1710 in which the screen is partitioned into a first section 1720 showing the current image being received by the camera 1712 and a second section 1722 dedicated to displaying a bright white light to illuminate the face of the user. In other implementations, the screen displays other colors during the image capture process (e.g., all red, all blue). In such implementations, the colored screen will be reflected by the user's face, but not by more distant objects, thus creating an image in which the user in the foreground can be more easily discriminated from objects in the background. Such captured images can be matched with enrolled authentication images that are also taken in a low-lighting situation, thus increasing the accuracy of the facial recognition process.

Returning to FIG. 6, once the one or more images of the user are captured, facial recognition is performed at 616. In certain embodiments, the facial recognition process involves comparing facial components extracted from the one or more captured images to facial components extracted from images stored on the mobile device of the authorized user and determining whether the user in the one or more captured images is the authorized user. The stored images used for authentication purposes can be captured during an enrollment phase (e.g., enrollment phase 1100 shown in FIG. 11 and discussed more fully below). The enrollment phase can be performed, for example, when the user sets the security settings for the mobile device. Further, in some implementations, feature descriptors are generated for the authentication image and stored locally on the mobile device as part of the enrollment phase. By storing the feature descriptors of the authentication images locally on the device, the speed with which the matching and authentication processes are performed can be increased.

At 620, a determination is made as to whether the user in the one or more captured images is the authorized user. This determination can be made as part of the facial recognition process or using results from the facial recognition process. Exemplary techniques for matching are described below with respect to method act 1430 of FIG. 14. Further, in some embodiments, one or more other images (which may or may not contain the user's image) are used during the facial recognition process. For example, images of the user's friends or other acquaintances can be used during the facial recognition process as a set of "negative examples" that are used to cross verify a correct match. If the user in the captured image(s) is determined to be the authorized user, then the mobile device is unlocked at 622 (e.g., one or more applications, services, or data files are made available to the user that were previously unavailable). If the user in the captured image(s) is not the authorized user, then, in the illustrated embodiment, a secondary authentication procedure is performed at 624. For example, in some embodiments, the secondary authentication procedure is a procedure that is not based on facial data (e.g., a voice authentication technique or password request technique).

Figure 13:
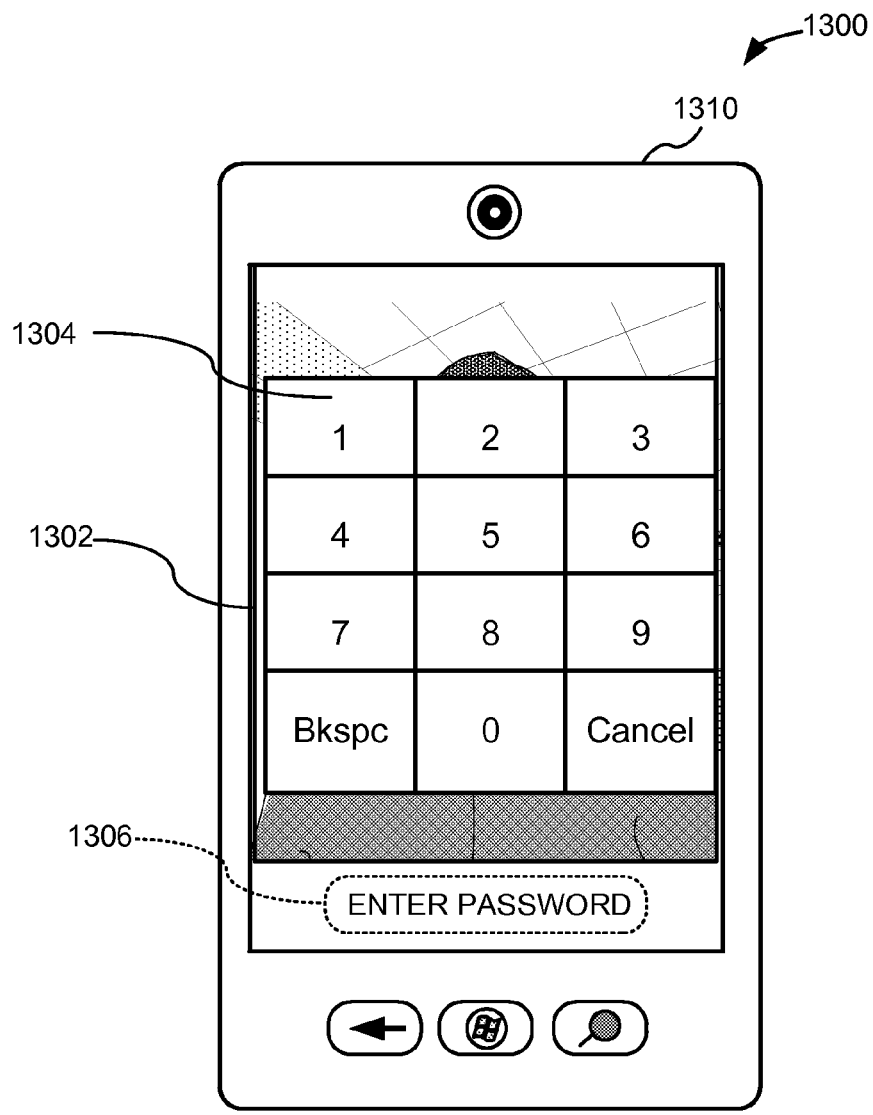
FIG. 13 illustrates a password input screen that can be used in connection with embodiments of the disclosed technology.

FIG. 13 is a schematic block diagram 1300 illustrating an example secondary authentication screen 1302 on a mobile device 1310. In the illustrated embodiment, the secondary authentication screen 1302 prompts the user to input a password for identifying the user as the authorized user. The password can be established previously by the user when setting the security parameters for the mobile device. In the illustrated embodiment, the screen 1302 displays a touch-screen numeric keypad 1304 for allowing the user to enter the password and includes a portion 1306 that displays a prompt to the user and informs the user of whether the password is accepted or rejected.

At 624, a determination is made to whether the user is authorized as a result of the secondary authentication process. For example, a determination can be made as to whether the password entered by the user matches the authorized user password stored by the mobile device. If the user is authorized, then the mobile device is unlocked at 622. If the user is not authorized, then an authentication failure screen is displayed at 626 and the device remains in the locked state. In certain embodiments, the process is then repeated. In other embodiments, the user is given one or more further opportunities to try to authenticate himself or herself using the secondary authentication process before the process is repeated. Still further, if a certain number of failed facial recognition or secondary authentication attempts are made, then the phone can remain in the locked state for a fixed period of time or until receipt of a remotely transmitted message allowing further attempts to authenticate (e.g., from a smart phone service provider).

The user authentication method 600 shown in FIG. 6 should not be construed as limiting, as it can be modified in a wide variety of manners. For instance, in some embodiments, no secondary authorization procedure is implemented. In further embodiments, the secondary authorization procedure is performed in addition to the authorization procedure using facial data and requires the user to also pass the authorization procedure using facial data. In other words, multiple authentication procedures are implemented and required each time a user is authenticated for using the device. In such embodiments, the individual authorization procedures can be performed in any order. In one example, the primary authorization procedure is based on facial recognition using any of the techniques described herein, and the secondary authorization technique is the input of a password via a keypad (e.g., as shown in FIG. 11).

In order to perform facial recognition at 616, one or more authentication images are captured and stored as part of an enrollment phase. In particular, the establishment of the stored images for authentication purposes (sometimes referred to as the "authentication images" or "enrolled images") involves the user capturing one or more images of himself or herself and accepting the image(s) as being accurate for authentication purposes. Furthermore, in certain embodiments, images are captured of the user in a variety of lighting situations, from different camera orientations, with different facial orientations, and/or with different facial expressions. For example, a series of image capture screens can prompt the user to create a series of suitable authentication images in a variety of imaging conditions (e.g., illumination and/or expression variations). As each authentication image is captured, the user can be prompted to accept or reject the image and retry capturing the image. By creating a series of authentication images under a variety of conditions, the facial recognition can be performed more effectively with fewer false positives. For instance, the use of authentication images of the user making a certain facial expression can help minimize the threat of a non-authorized user being able to gain access by "spoofing" the user with a photograph or other image of the user during the authentication process. In other words, the user can create an authentication image while making a facial expression that is known only to the user, thus making it unlikely that other images of the user with the same facial expression exists. In other embodiments, a set of authentication images is captured with the user making different facial expressions in each image. Then, during authentication, one of the facial expressions is selected randomly and the user is requested to make the randomly selected expression by an image capture screen during device authentication. This process helps lower the chance that an unauthorized user has a picture of the user making the expression that will unlock the phone by "spoofing" the user.

Any of the authentication images or negative examples can be stored locally on the device. In some embodiments, the authentication images or negative examples are stored on a remote server (e.g., in a cloud environment as explained above). Furthermore, any of the authentication images or negative examples can be shared among devices used by the authorized user. The facial recognition process can be performed using a variety of different methods. Embodiments of suitable facial recognition and authentication processes are described in more detail below in Section III. The embodiments in Section III are particularly adapted for use in mobile devices and with cameras that are typically implemented in mobile devices, which present unique challenges to the facial recognition process.

Figure 11:
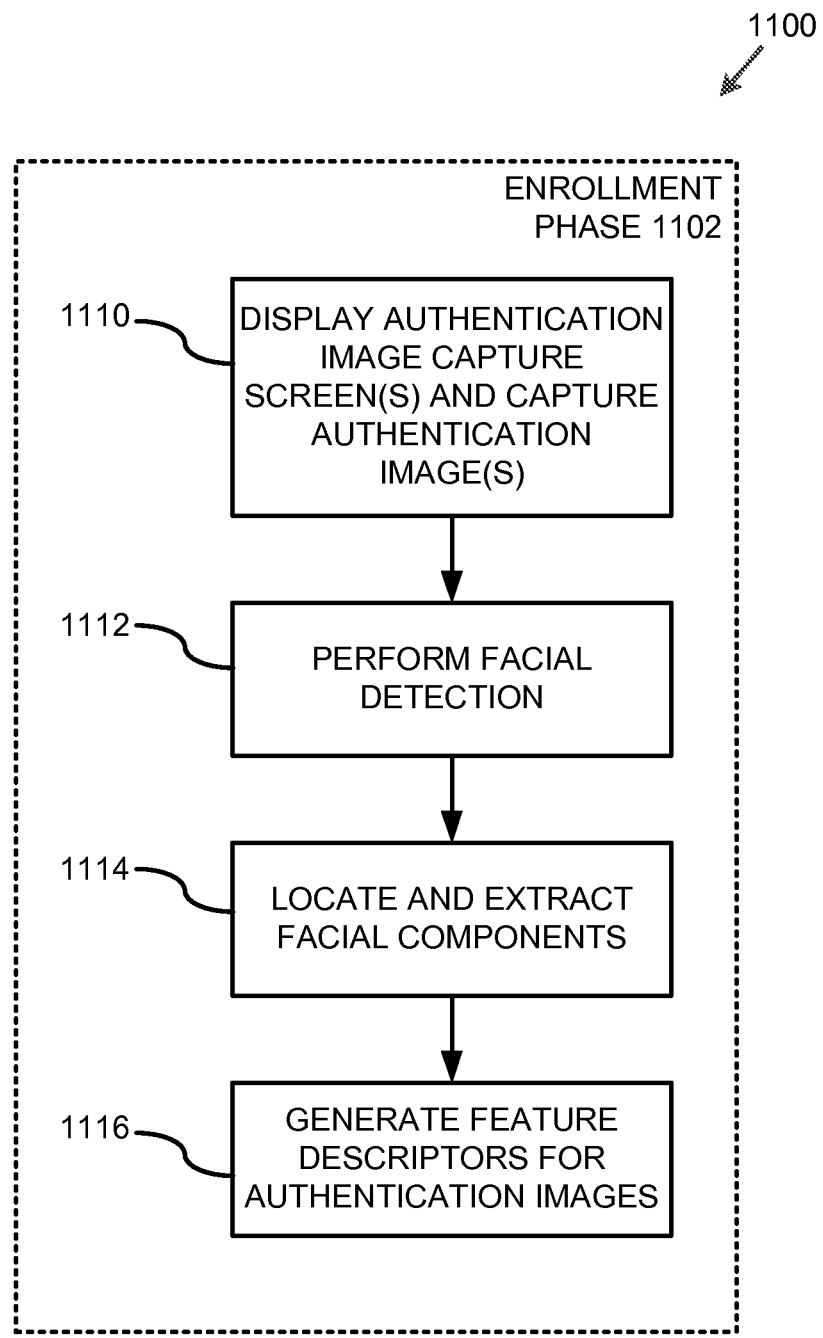
FIG. 11 is a flowchart of an exemplary method for capturing one or more authentication images for use with embodiments of the disclosed technology.

FIG. 11 is a flowchart of an exemplary method 1100 for capturing one or more authentication images and generating feature descriptors for the images in an enrollment phase 1102. The illustrated method 1100 can be performed in advance of a user's request to authentic himself or herself to the mobile device. The enrollment phase 1102 can be used to create a gallery of authentication images of the authorized user. Any of the image capture screens described above with respect to FIGS. 7-10 or features therein can be used to assist in the generation of the authentication images. Other suitable image capture screens include those in FIG. 12 and discussed more fully below.

At 1110, a set of authentication images is captured. In particular implementations, the authentication images are diverse and include the user in a variety of different imaging conditions. For example, the authentication image can be an image of the front of the user's face, an image of the side of the user's face, an image of the user with the camera held at waist height, an image of the user with the camera at eye level, an image in the dark using light from the touchscreen, an image in dim light, an image in bright natural light, an image in incandescent light, and/or an image with the user making a user-selected or predetermined facial expression (such as a smile, a frown, a wink, an open-mouth expression, puffed-cheek expression, angry expression, a both-eyes-closed expression, a tongue-out expression, or any other expression).

Figure 12:
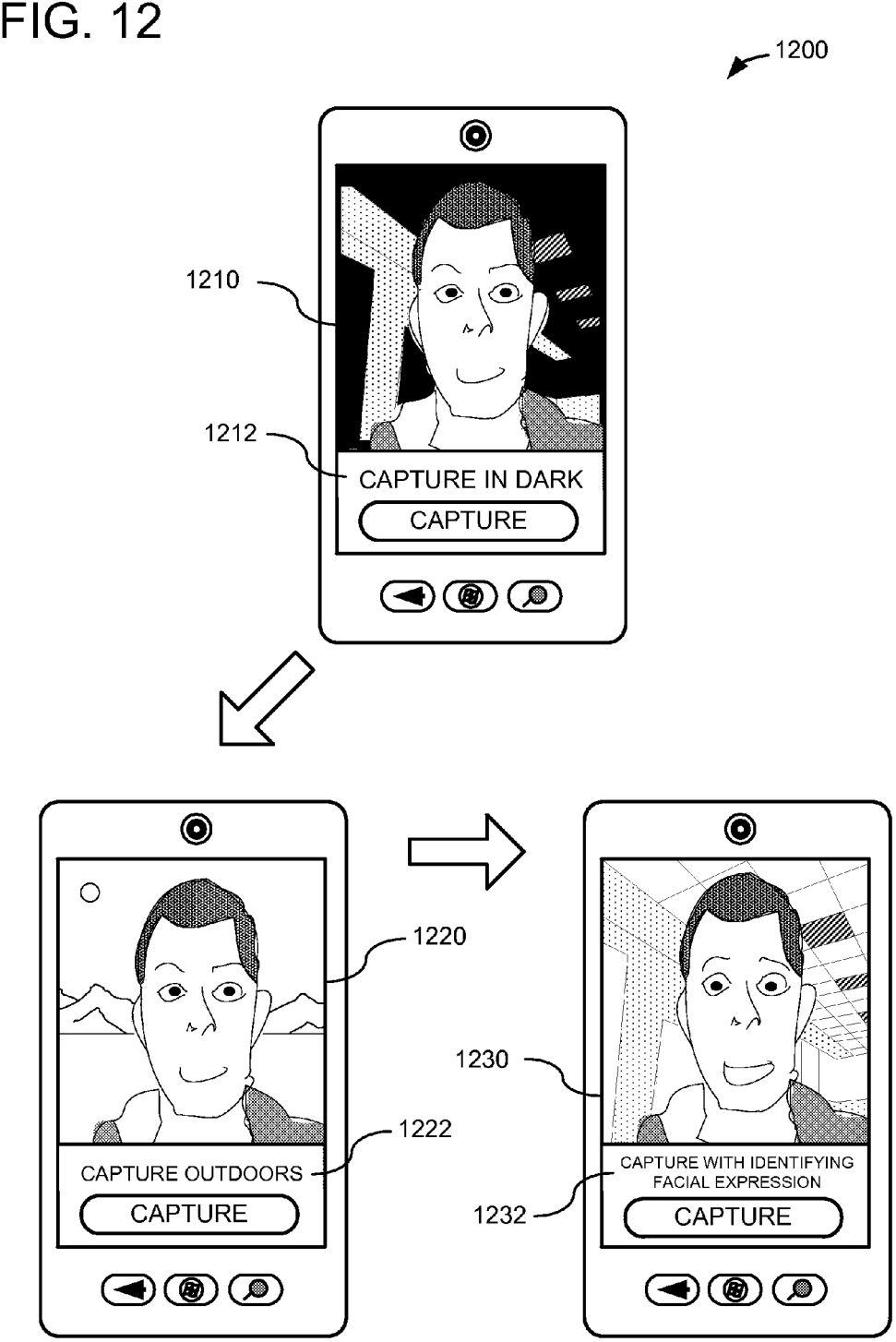
FIG. 12 illustrates exemplary image capture screens as can be used to capture one or more authentication images for use with embodiments of the disclosed technology.

FIG. 12 is a schematic block diagram 1200 illustrating a series of image capture screens that prompt the user to create suitable authentication images in a variety of imaging conditions (e.g., illumination and/or expression variations). In the particular examples shown in FIG. 12, a first image capture screen 1210 includes a prompt 1212 requesting the user to capture the image in a low-lighting situation, such as in a dark room or outside at night. When the user is in the requested environment, the user can trigger the image capture by pressing a touchscreen capture button 1213 or any other suitable trigger button. In other embodiments, the image capture can be triggered automatically when a face is detected as being in the image. For instance, a face detection process (such as the face detection process at 1420) can be continuously run to analyze the current image being viewed by the image sensor. Then, when a face is detected as being within the image, the image capture process can be triggered and the currently viewed image can be stored for further processing. For the image captured in the dark, light from the touch screen can be used to illuminate the user's face. In certain implementations, the user can be prompted to either accept the image as a representative authentication image or request that the image be recaptured. FIG. 12 also shows a second image capture screen 1220 that includes a prompt 1222 requesting the user to capture the image in a sunlit, outdoor environment. Capturing of the image can be performed as with the first image capture screen 1210. FIG. 12 further shows a third image capture image 1230 that includes a prompt 1232 requesting the user to capture the image while the user is making a user-selected identifying facial expression. In other implementations, the prompt can specify the facial expression that the user should make. Capturing of the image can be performed as with the first image capture screen 1210. The three example image capture screens 1210, 1220, 1230 should not be construed as limiting in any way, as more or fewer screen can be used. Further, the requested lighting environments or facial expressions can vary widely and include any of the lighting situations or expression described herein, or in any other suitable lighting environment or expression.

Returning to FIG. 11, at 1112, facial detection is performed for the captured authentication images. For instance, the facial detection technique described below with respect to method act 1420 of FIG. 14, which uses an implementation of the Viola-Jones facial detector, can be used.

At 1114, one or more facial components are detected and localized. For instance, the facial landmark localization technique described below with respect to method act 1422 of FIG. 14 can be used. Further, the alignment and illumination rectification techniques described below in connection with method acts 1424, 1426, respectively, can be used.

At 1116, feature descriptors for the one or more captured authentication images are generated and stored. For instance, the feature descriptors can be generated according to any of the embodiments described below with respect to method act 1428.

In particular embodiments, and as illustrated in FIG. 11, the facial detection at 1112, the facial component detection and localization at 1114, and the feature descriptor generation at 1116 are performed in the enrollment phase, before a user requests authentication. In such embodiments, the resulting feature descriptors are stored for later reference and comparison with the feature descriptors of captured images. In some embodiments, the facial detection at 1112, the facial component detection and localization at 1114, and the feature descriptor generation at 1116 are performed later (e.g., during the authentication phase).

The exemplary method 1100 should not be construed as limiting, as other techniques for generating authentication images or identifying images for use as authentication images can be used. For instance, in certain embodiments, the enrollment phase can be automated by using photos previously tagged as the authorized user of the phone from images stored on the phones, from the cloud, from a user's social network account, and/or from the user's personal profile associated with the mobile device or other account.

III. Example Facial Recognition Methods

Exemplary methods for performing facial recognition are described in this section. The various method acts of the disclosed embodiments can be used alone or in various combination and subcombinations with one another or with other facial recognition techniques. Embodiments of the disclosed facial recognition techniques are particularly suited for use with mobile devices, which present a number of unique environmental and performance issues. For example, on account of their mobile design, mobile devices are exposed to a wide variety of environments (e.g., outdoors, indoors, sunshine, night, crowded rooms, elevators, cars, buses, trains, and so on). Furthermore, users often use mobile devices as they are walking, making them far more dynamic than traditional desktop devices. As a consequence of the dynamic manners and environments in which mobile devices are used, there is enormous variation in the images captured by a mobile device. Furthermore, the images captured on a mobile device are not typically of the highest quality. For instance, the camera (e.g., the frontal camera) and display may be configured for capturing and displaying at a relatively low resolution (e.g., a resolution of 640×480 pixels or lower). Embodiments of the facial recognition technique are desirably adapted to account for one or more of these issues.

A. Example Learning-Based Facial Recognition Techniques

Figure 14:
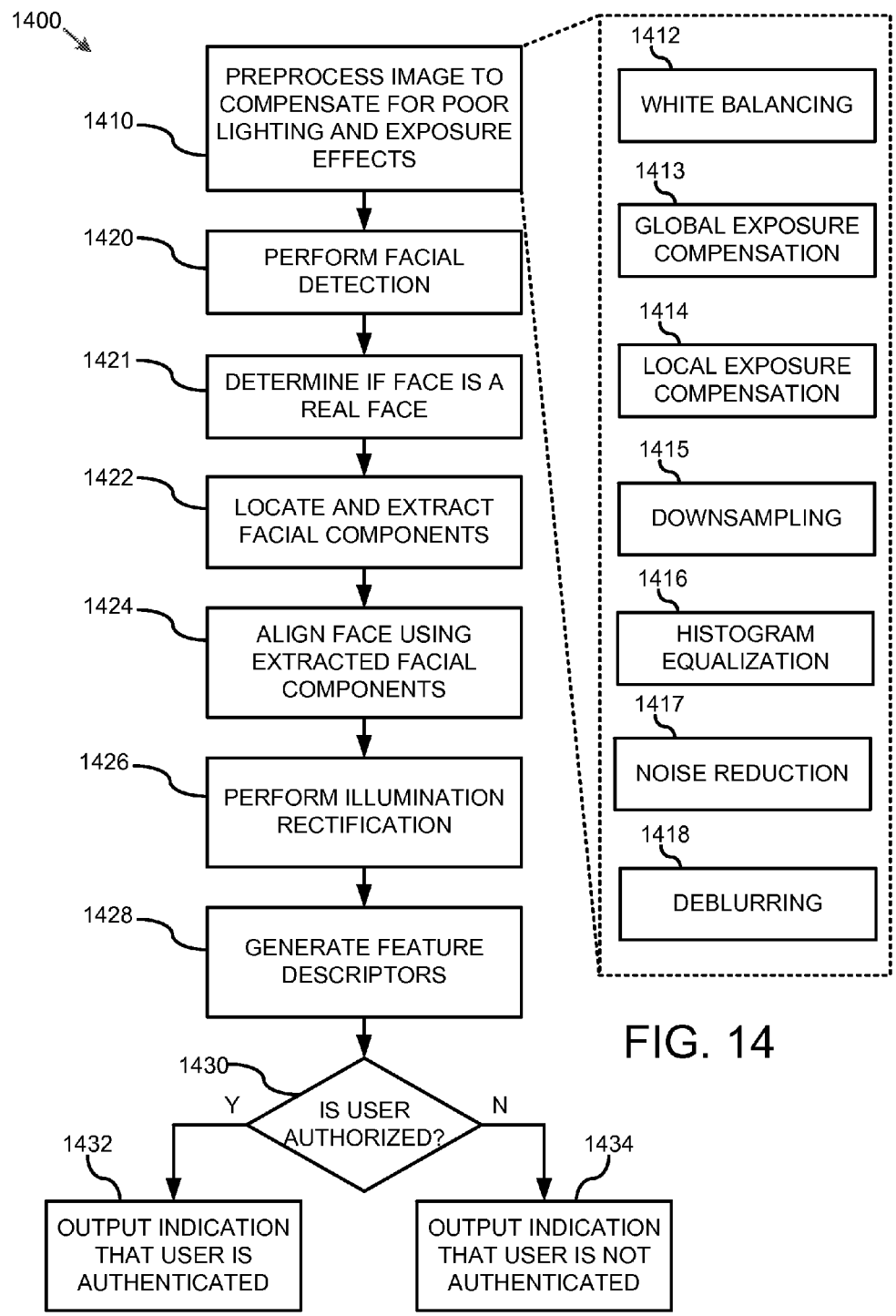
FIG. 14 is a flowchart of an exemplary method for performing facial recognition and authenticating one or more captured images to one or more authentication images using learning-based feature descriptors.

FIG. 14 is a flowchart illustrating an exemplary method 1400 for performing facial recognition for one or more captured images. The exemplary method will be described below in the context of a mobile device, such as a smart phone. It is to be understood, however, that the method can be applied in other contexts as well and used by any of the computing devices described above. For example, the exemplary facial recognition method can be performed using an image sensor attached to an entertainment console or television. Furthermore, in certain embodiments, one or more of the method acts shown in FIG. 14 are performed using parallel processing (e.g., using single-instruction, multiple-data ("SIMD") operations). For instance, any one or more of the pre-processing, facial detection, feature extraction, or feature descriptor generation can be performed using SIMD operations.

In general, the embodiment illustrated in FIG. 14 generates one or more feature descriptors for facial components of the user's face from the one or more capture images (e.g., captured using any of the image capture screens described above with respect to FIGS. 7-10). The feature descriptors are then compared to feature descriptors for one or more authentication images to determine whether the user is authorized. The embodiment illustrated in FIG. 14 assumes that feature descriptors for the one or more authentication images have been previously computed. The feature descriptors for the one or more authentication images are typically computed and stored beforehand (e.g., in a setup, preparation, or enrollment phase, such as enrollment phase 1100) in order to increase the speed of the authentication, though the feature descriptors for the authentication images could be computed in real time. In certain embodiments, the feature descriptors for the authentication images are computed using the same process as shown in FIG. 14 and described below.

At 1410, preprocessing is performed to compensate for poor lighting and exposure effects in the captured image. For example, preprocessing can be performed to help compensate for poor lighting conditions when the image was taken (e.g., lighting from only the screen of the mobile device or lighting from an image taken at night or in a dimly lit environment, such as a restaurant, night club, car at night, or the like). In certain embodiments, one or more of the following techniques can be performed: white balancing 1412, global exposure compensation 1413, local exposure compensation 1414, downsampling 1415, histogram equalization 1416, noise reduction 1417, or deblurring 1418. In particular embodiments, all of the identified techniques are performed. In other embodiments, however, only a subset of one or more of the identified techniques are performed. For instance, in some implementations, local exposure compensation can be performed without global exposure (or vice versa) in order to increase performance speed.

White balancing 1412 removes unrealistic color casts in an image resulting from the color temperature of the light sources providing light for the image. A number of different automatic white balancing techniques can be used, including embodiments of the "grey world" or "white patch" method. In one embodiment, white balancing is performed by determining a neutral point in the image and computing the correction to apply to the R, G, and B values of the neutral point in order for it to match the corresponding neutral point from a black body radiation model. In one particular implementation, the neutral point of an image is determined by converting the image to a color-opponent space (in which the image is represented by a luminance value and two chrominance values), such as lab color space, and computing the averages of the two color (or chrominance) components. For example, in lab color space, the average of the a values in the image and the average of the b values in the image are computed. The average a and b values of the image are then used as the estimated color of the illuminant. The lab color space values can then be converted back to RGB space. From the estimated color of the illuminant, correction values can be determined for the RGB values using a black body radiation model. The correction values can then be applied to each of the RGB values in the image. In certain embodiments, the image can be downsampled to a lower resolution before white balancing is performed. Further, in some embodiments, the image can be filtered or processed before the white balancing is performed. For instance, points (or pixels) in the image that are highly saturated can be removed before white balancing is performed. If the light source for the image is known (e.g., if the light source is the sun or light from the screen of the mobile device), this information can be used to select the neutral point in the image. Additionally, in some implementations, because the images are of a human's face, the neutral point can be selected while accounting for the fact that the image is of a human face (e.g., by using a bias value).

Global exposure compensation 1413 increases the global contrast of the captured image using histogram equalization. In particular embodiments, the image is first transformed to a color-component space, such as the lab color space. In the color-component space, the luminance values of the image are then compensated through a histogram equalization process. Through the compensation procedure, which spreads out the most frequent luminance values, the luminance values become more evenly distributed throughout the image, thereby increasing the global contrast of the image. To accomplish the compensation procedure, a transformation function for each of the original luminance values is determined, where the transformation function serves to linearize the luminance values across a value range (e.g., a range from 0 to 255). The exposure compensation procedure is global in the sense that it is performed across the entire captured image. Furthermore, the global compensation procedure is useful for an image captured by a mobile device in poor lighting situations because the image from such situations typically results in a low-contrast image (e.g., as a result of the illuminant for the image being the touchscreen from the mobile device or other achromatic light source). In certain embodiments, the image can be downsampled to a lower resolution before white balancing is performed.

Local exposure compensation 1414 is similar to global exposure compensation but is applied to subsets of pixels in the image. In one particular implementation, the image is partitioned or broken down into two-dimensional tiles of a fixed size (e.g., 256×256). Padding is added to the subsets if necessary. The exposure compensation procedure is then applied to each subset of pixels individually to compute a separate transform for each subset (e.g., a separate transform for each tile). A transform is then applied to each tile that is based at least in part on the computed transform. For example, in particular implementations, the transform that is applied to a respective subset of pixels is a weighted average of the transform for the respective subset and the transforms of the other subsets. The weights in the weighted average can be set so that the weight is based on the distance of the pixel from the center of the respective subset. For instance, the weights can be set so that the further the subset of pixels is from a respective subset, the lower weight (or less influence) it has. In other words, the weight is calculated based on the distance of the pixel from the center of each tile so that the further from the center the other tile is, the lower the weight the transform for the other tile is given in the weighted average.

Downsampling 1415 comprises downsampling the image to reduce its resolution and can be performed before any or all of white balancing 1412, global exposure compensation 1413, or local exposure compensation 1414. Because the image being processed at 1410 typically comprises an image of the user's face at a close distance to the image capture device, the user's face forms the majority of the image. Consequently, in some embodiments, it is not necessary for the image to be at the highest available resolution in order to accurately perform facial recognition. For instance, it has been observed that by downsampling the image to a lower resolution, false positives caused by faces in the background of an image can be reduced. Furthermore, by downsampling the image to a lower resolution, the speed with which facial recognition can be performed can be increased. In particular implementations, the image can be downsampled to one of the following resolutions: 120×160, 60×80, or 30×40. Furthermore, if facial recognition fails at the downsampled resolution, then the procedure can be repeated using a higher resolution version of the image (e.g., the image at its original resolution).

Histogram equalization 1416 can be performed in addition to or instead of the histogram equalization performed in connection with the global exposure compensation 1413 or local exposure compensation 1414 and can further increase the contrast of the image by more evenly distributing the intensity values in the image. Any of the histogram equalization techniques mentioned above or other known histogram equalization techniques can be used.

Noise reduction 1417 can be performed by applying one or more suitable noise filters. For example, in certain embodiments, one or more of a median, average, and/or Wiener filter are applied to the image. Additional details of these filters and further examples of suitable noise filters are described in R. Gonzales et al., *Digital Image Processing*, 3rd ed. (2008).

Similarly, deblurring 1418 can be performed by applying one or more suitable deblurring filters. For example, in certain embodiments, one or more of a Wiener or Lucy-Richardson filter and/or a blind deconvolution technique are applied to the image. Additional details of these filters and further examples of suitable deblurring techniques are described in R. Gonzales et al., *Digital Image Processing*, 3rd ed. (2008).

At 1420, face detection is performed. In certain embodiments, face detection is performed using an implementation of a Viola-Jones detector. Briefly, in certain implementations, the image is partitioned in multiple two-dimensional partitions that are at least partially overlapping. Each partition is then evaluated with one or more filters (sometimes referred to as "weak classifiers"). The filters can take the form of so-called "rectangle features", which are simple binary classifiers that compute the difference(s) between sums of pixel values in different rectangular regions and can have different scales. For example, the one or more filters may include a two-rectangle feature (whose value corresponds to the difference between the sum of the pixel within two rectangular regions), a three-rectangle feature (whose value corresponds to the sum of pixel values in two outside rectangles from the sum in a center rectangle), or a four-rectangle feature (whose value corresponds to the difference between the sum of two diagonal pairs of rectangles) Further, a learning algorithm can be applied to the weak classifiers using one or more reference images so that only the most important weak classifiers are selected based on their hit rate and miss rate. The weak classifiers can be further assembled into strong classifiers and applied in a cascade architecture in order to increase the speed with which the detection can be performed.

The face detection process at 1420 can be improved in embodiments of the disclosed technology by using captured image(s) in which the user is positioned and sized within the frame in a position and distance from the camera that matches the reference images. For example, the image capture screens in FIGS. 7-10 described above can be useful in capturing images that are efficiently processed for face detection purposes.

At 1421, the face in the image is optionally analyzed to determine whether the face is of a real human (and not from a photo, video, or other two-dimensional representation used to "spoof" the user). In certain embodiments, the "liveness" detection performed during this method act can be performed by capturing an image of the user making a gesture or motion. Further, in certain implementations, this detection is performed by using a depth camera on the mobile device that can determine whether the face is a three-dimensional object. In some embodiments, the determination at 1421 is made by displaying an image capture screen to the user that prompts the user to perform a particular or randomly selected facial expression or head movement (e.g., a screen that prompts the user to blink, open and loosen his or her mouth, move his or her head within the same image plane (by rotating the head but not giving a side view), or move his or her head outside of the image plane (by rotating the head to present a side view). One or more different head movements can be requested of the user and the resulting images can be compared to corresponding enrolled images. Because a spoofed image is highly unlikely to track the requested movements, the comparison can produce an authentication result with high accuracy. In some implementations, only one frame of the user is captured. In such implementations, a suitable modeling technique can be used to detect the surface properties of the live human face, such as the technique described in X. Tan et al., "Face Liveness Detection from a Single Image with Sparse Low Rank Bilinear Discriminative Model," *ECCV*, pp. 504-517 (2010). The technique can then be used to differentiate between a real face and fake face pictures. In further embodiments, the technique performed at method act 1421 is targeted for one or more particular types of "spoofing" that may allow for unauthorized authentication. For example, the "liveness" detection technique can be targeted against picture spoofing, video spoofing, and/or someone who created a 3-D model of the user. For example, in particular implementations, the "liveness" detection technique can protect against still picture spoofing by detecting the face of the user, tracking one or more feature points on the detected face over multiple consecutive frames, estimating an affine transform between frames, measuring the residual between the affine estimate of the current frame and a previous frame, and determining whether the face is real or fake based on the magnitude of the residual (e.g., the summation over the frame and/or over a number of frames). In yet another embodiment, a 3-D model is constructed from the face in the captured image (e.g., using PhotoSynth or other such 3-D model generating technique). A real face typically has a distinct 3-D structure (or 3-D point cloud) resulting from such techniques that can be used to discriminate between a real face and a fake face. Any other "liveness" detection technique can also be used.

At 1422, facial components (also referred to as face landmark points) are located and extracted. Facial components can be located and extracted using filters similar to those used in face detection, but specifically selected for face landmark points (e.g., eyes, nose, mouth, or other such distinctive face landmarks). For example, in certain embodiments, eyes, nose, and mouth points are located. In particular, in certain implementations, corners of the user's mouth, the four corners of each of the user's eyes, and both nostrils of the user are extracted.

At 1424, face alignment (or facial component alignment) is performed using the extracted facial components. This act is sometimes referred to as "geometric rectification" and aligns the face or faces from an image onto a common reference frame. As a result of this process, the face landmark points are brought into a canonical form, typically the form as if the person were looking directly forward at the camera. Thus, the face alignment process can be used to adjust for posture differences, angular face differences, and camera angle differences between images. As a result of the face alignment, the matching can be performed according to a consistent facial model.

At 1426, illumination rectification is performed. In general, illumination rectification involves adjusting (or normalizing) the luminance values to a common set of reference values. For example, the luminance values in the captured image can be adjusted so that the mean or median luminance values correspond to the mean or median luminance value in the reference images.

At 1428, feature descriptors (sometime referred to as "feature vectors") are generated for the extracted facial components. For example, feature descriptors can be generated with local binary patterns and/or textons using a component-based method. In certain embodiments, the feature descriptor generation process includes generating low-level feature vectors, normalizing and filtering the low-level feature vectors, encoding the low-level feature vectors using a learning-based method, dividing the resulting encoded image into two-dimensional sections, computing histograms for the resulting sections, and forming the final feature descriptor for the extracted facial component using the histograms.

In particular, and according to one exemplary embodiment, low-level feature vectors are formed for the extracted components by sampling neighboring pixel values for each pixel in the extracted component using a sampling pattern. In particular implementations, a ring-based pattern is used to locate the sampling points for each pixel. The ring-based pattern can have various numbers of rings, sampling points, or radii. In one particular implementation, the ring-based pattern has two rings of radius 4 and 7 and samples r×8 neighboring pixels at even intervals along each of the rings.

The resulting low-level feature vectors are normalized to a common vector unit length and, in some implementations, further filtered. For example, the normalized low-level feature vectors are filtered using a difference of Gaussians ("DoG") filter. The normalization and filtering can be used to help compensate for local photometric affine change. An encoding method is applied to the normalized low-level feature vectors, thereby generating a set of discrete codes. In certain embodiments, each low-level feature vector at each pixel is encoded as one of 256 codes. In particular implementations, the encoding is performed using a learning method that is specifically trained for the face. For example, one or more of a K-means, PCA tree, or random-projection method can be used. In one implementation, a random-projection tree and PCA tree recursively split the data based on a uniform criteria so that each leaf of the tree input the same (or approximately the same) number of vectors. The learning-based encoder can be trained using images of the user's face stored on the device (e.g., the reference images) or can be pre-trained by a much larger set of test images before it is used in the mobile device (e.g., pre-trained before implementation and storage in a mobile device). After learning-based encoding, the image is transformed into a "code" image. In certain implementations, for example, the encoded image is divided into a grid of "patches" (e.g., two-dimensional sections). The patches can be adjacent to one another, overlapping, or partially overlapping. In some implementations, histograms are formed for each of the resulting patches. The patch histogram for a respective patch can indicate the number of instances (or the count) of the codewords within the patch. The patch histograms can then be concatenated or otherwise assembled with one another to form a descriptor for the extracted component or for the image as whole. In particular implementations, the descriptor is compressed (e.g., using any suitable compression method, such as Principle Component Analysis ("PCA")). After compression, a normalization process can be performed again, there creating the final feature descriptor for a facial component (sometimes referred to as a "learning-based feature descriptor" or "LE feature descriptor"). In certain embodiments, two or more descriptors are generated for each facial component. In these embodiments, the descriptors are generated from different sampling patterns and used to provide additional descriptors for matching the facial components.

Additional details concerning the Viola-Jones facial detection process and the feature descriptor generation process as can be used in embodiments of the disclosed technology are described in Paul Viola et al., "Robust Real Time Object Detection," *Second International Workshop on Statistical and Computational Theories of Vision—Modeling, Learning, Computing, and Sampling* (2001), and Z. Cao et al, "Face Recognition with Learning-Based Descriptor," *IEEE CVPR 2010*, pp. 2707-2714 (2010). It should be understood that other feature descriptors or feature descriptor generation techniques can be used in addition to or in place of the technique described above. For example, techniques based on local binary patterns ("LBPs"), histograms of oriented gradients ("HOGs"), Gabor wavelets, or kernel linear discriminant analysis ("LDA") can be used to compute feature vectors that are compared with corresponding feature vectors from one or more authentication images. See, e.g., N. Dalal et al., "Histograms of Oriented Gradients for Human Detection," *Proc. of CVPR*, pp. 886-893 (2005); T. Ojala et al., "Multiresolution Gray-Scale and Rotation Invariant Texture Classification with Local Binary Patterns," *IEEE Trans. on Pattern Analysis and Machine Intelligence*, vol. 24, no. 7, pp. 971-987 (2002); L. Wiskott et al., "Face Recognition by Elastic Bunch Graph Matching," *IEEE Trans. on Pattern Analysis and Machine Intelligence*, vol. 19, no. 7, pp. 775-779 (1997). Additionally, in some embodiments, a graph-based technique is used, which is described in more detail below.

At 1430, the feature descriptors for the one or more captured images are compared to the feature descriptors for one or more reference images to determine whether the user in the captured image(s) matches the user in the authentication images. If so, then an indication that the user is authenticated is output at 1432; otherwise, an indication that the user is not authenticated is output at 1434. The comparison at 1430 can be performed using a variety of matching techniques, examples of which are described below. In some embodiments, the comparison is performed using a composite descriptor representative of the entire face of the user (sometimes referred to as the "facial descriptor"). For instance, the feature descriptors for the extracted facial components are concatenated with one another in a predetermined sequence (e.g., left eye, right eye, nose, left side of mouth, right side of mouth) in order to generate the composite descriptor representative of the entire face in the image. In other embodiments, however, the feature descriptors for the extracted facial components remain separated from one another and are used separately during the matching process. For ease of presentation, the discussion below assumes the use of the individual feature descriptors for the extracted facial components, although it should be understood that the matching procedure can be performed using a facial descriptor or any one or more of the feature descriptors for the individual facial components in combination with one another.

In some embodiments the comparison process is performed by computing the "distance" (also referred to as the "difference") between the facial descriptors for the one or more captured images and the corresponding facial descriptors for one or more authentication images. The distance can be computed as the Euclidian distance between facial descriptors. For instance, for a given feature descriptor from a captured image and a corresponding feature descriptor from an authentication image, the distance can be the sum of the absolute value of the differences between corresponding histogram values of the feature descriptor for the captured image and the feature descriptor of the authentication image, thus producing a difference value for each pair of feature descriptors. The difference values for each of the feature descriptors of the captured image and the authentication image can then be summed to produce an overall image difference. In other implementations, the difference values can be combined in other ways (e.g., averaged or using a weighted sum that places more weight on certain feature descriptors).

As noted, a number of matching methods can be used to match a captured image to one or more authentication images. For example, in certain embodiments, the feature descriptors of a single captured image are compared against the feature descriptors for multiple authentication images. In one implementation, the overall image differences between the feature descriptors for the captured image and the corresponding feature descriptors for the authentication images are computed, resulting in a distance value for each comparison between the captured image and a corresponding authentication image. The smallest distance between the captured image and an authentication image is then selected and compared to a threshold value. If the smallest distance is less than the threshold distance, then a match is determined and the user in the captured image is authenticated at 1432; otherwise, the user is not authenticated at 1434.

In another implementation, the distance values between the captured image and corresponding individual authentication images is compared to a first threshold value. The number of authentication images satisfying the first threshold value is then compared to a second threshold value (representing the minimum number of matches to authenticate the user). If the second threshold value is satisfied, the user in the image is authenticated at 1432. The second threshold value can be a fixed value (2, 3, and so on), or can be computed relative to the number of authentication images available. For instance, the second threshold value can be determined to satisfy a predetermined or user-selected ratio or percentage of the authentication images, rounded up, down, or to the nearest integer. For example, the second threshold can be set so that the user is authenticated if at least ⅓ of the authentication images are determined to match the captured image. Thus, if 6 authentication images are available (e.g., stored on the mobile device), then the user will be authenticated if the overall distance between the captured image and at least two of the authentication images are below the first threshold.

In another implementation, a distance value for each comparison between the captured image and a corresponding authentication image is computed as above. The distance values are then averaged, resulting in an average distance value for the comparison between the captured image and the authentication images. The average distance value is compared to a threshold value. If the average distance value is less than the threshold distance, then a match is determined and the user in the image is authenticated at 1432; otherwise, the user is not authenticated at 1434.

In further implementations, any of the above techniques are supplemented with an additional criteria. For example, in some implementations, a ratio between the maximum distance and the minimum distance between the captured image and the authentication images is computed and used as an additional criterion (e.g., a maximum-distance:minimum-distance ratio or a minimum-distance:maximum-distance ratio). In further implementations, the ratio between a minimum distance and a next minimum distance (the second minimum distance) is used as an additional criteria. Any of these ratios are then compared to a predetermined or user-selected ratio to determine whether the additional criterion is satisfied. For instance, in one exemplary implementation, a user in a captured image is authenticated if the distance between the captured image and at least N authentication images is below a threshold TH and the ratio of the maximum distance to the minimum distance is less than or equal to a ratio R. In another implementation, a user in a captured image is authenticated if the average distance between the captured image and the authentication images is below a threshold TH and the ratio of the maximum distance to the minimum distance is less than or equal to a ratio R.

In further implementations, distances between the captured image and one or more non-user images are used as an additional criteria. In such implementations, the distances between the captured image and the non-user images are computed and authentication occurs if, in addition to any of the other criteria described herein, the distances between the captured image and the non-user images are greater than a non-user image threshold value. In other implementations, a ratio between the distance of the captured image from the authentication images and the distance of the captured image from the non-user images is used (e.g., the ratio of the minimum distance of the captured image from the authentication images and the minimum distance of the captured image from the non-user images). The non-user images can be non-user images stored in the mobile device as part of the user's contact list, non-user images from the user's photo roll, and/or non-user images from a standard default set of non-user images. Further, the non-user can be a single non-user or multiple non-users. Additionally, if there are multiple photos of the same non-user, each of the images can be used individually, or the average distance for the non-user can be computed and used for comparison purposes.

In some implementations, multiple captured images are used. As explained above, in certain implementations of the image capture process, a series of images of the user are captured when the user is attempting to authenticate himself or herself (e.g., using the image capture screens of FIG. 10). In certain embodiments, each of the captured images is used individually to attempt authentication, and authentication is based on the single image that produces the minimum distance(s) according to any of the criteria described. In other implementations, authentication only occurs if a threshold number of the captured images satisfy the authentication criteria (e.g., any of the authentication criteria described herein). In still further implementations, the feature descriptors between the multiple captured images are averaged and the averages for the captured images are used for authentication.

In certain implementations, any of the techniques described herein can be modified by assigning a weight to the authentication images so that a given authentication image has a greater or lower influence on determining the existence of a match. In this way, authentication images with more-reliable feature fidelity (e.g., from better lighting situations) can be favored over authentication images with less-reliable feature fidelity. Weights can also be assigned to the feature descriptors for the facial components so that feature descriptors for more highly discriminatory facial components can have a greater weight than feature descriptors for less discriminatory feature descriptors.

As explained above, the one or more captured images can include the user making a particular facial expression or posing in a certain manner. In such instances, the authentication images will also include one or more images of the user making the same facial expression or posing in the same manner. In such instances, a match between a captured image in which the user is prompted to make a particular expression and an authentication image with the user making the same expression can be determined separately and/or can be given greater weight than matches between other captured and authentication images. As a result, the ability of the matching techniques described herein to uniquely and securely authenticate the user can be improved. Further, because the facial expression or pose may not be a typical expression or pose, or can be selected randomly from a set of predefined expressions at authentication time, the likelihood of "spoofing" the authentication process is reduced. Such a technique therefore provides for a more robust authentication scheme that other facial recognition techniques.

Additionally, although the above-described techniques concern matching images for authentication purposes. The techniques described can be extended to video. In other words, a video of the user to be authenticated can be captured and compared to one or more authentication videos. Further, the user can be prompted during the video capture process to make one or more gestures (e.g., eye blinks, winks, in-plane head motion (where the user moves his or her head but not enough to show their side), out-of-plane head motion (where the user moves his or her head to show their side), or other active facial gestures) or can capture involuntary facial movement. The gestures or facial movements can then be used during the authentication process to further identify the user as the authenticated user. In still further embodiments, the camera used to capture the images is a 3-D camera and depth data of the user's face is additionally used as part of the authentication and matching procedures described herein.

B. Example Low-Rank Graph-Based Facial Recognition Techniques

In this section, exemplary embodiments of a graph-based approach to performing authentication between a captured image and one or more authentication images are described. The graph-based approach can be used in addition to or instead of the learning-based technique introduced above.

Embodiments of the graph-based approach use two pieces of information for face authentication: the appearance of salient face components, and the spatial relationships among these components. Both of these pieces of information are used to construct a graph representation of the face. In other words, both appearance and geometric information are used in the graph representations.

Figure 15:
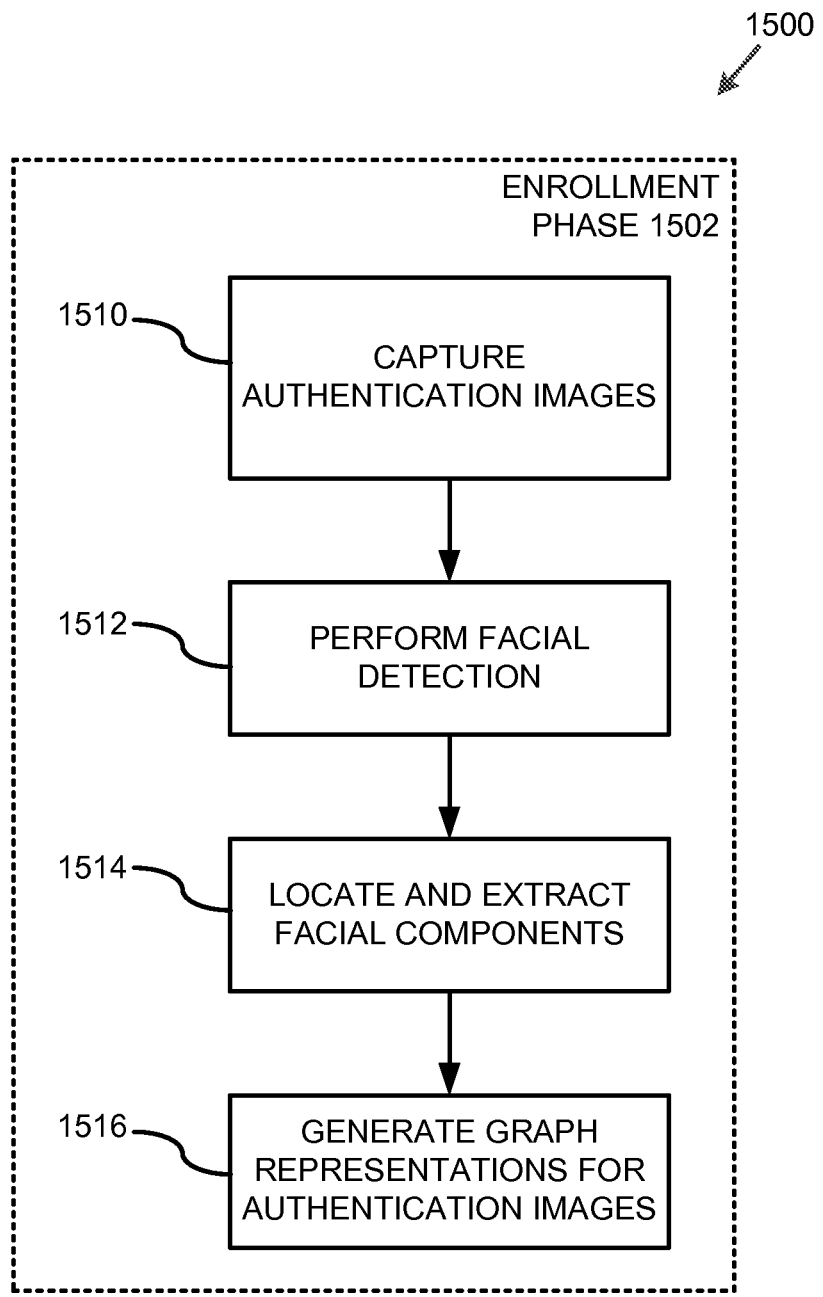
FIG. 15 is a flowchart of an exemplary method for capturing one or more authentication images and generating graph-based representations for facial components in the authentication images.
Figure 16:
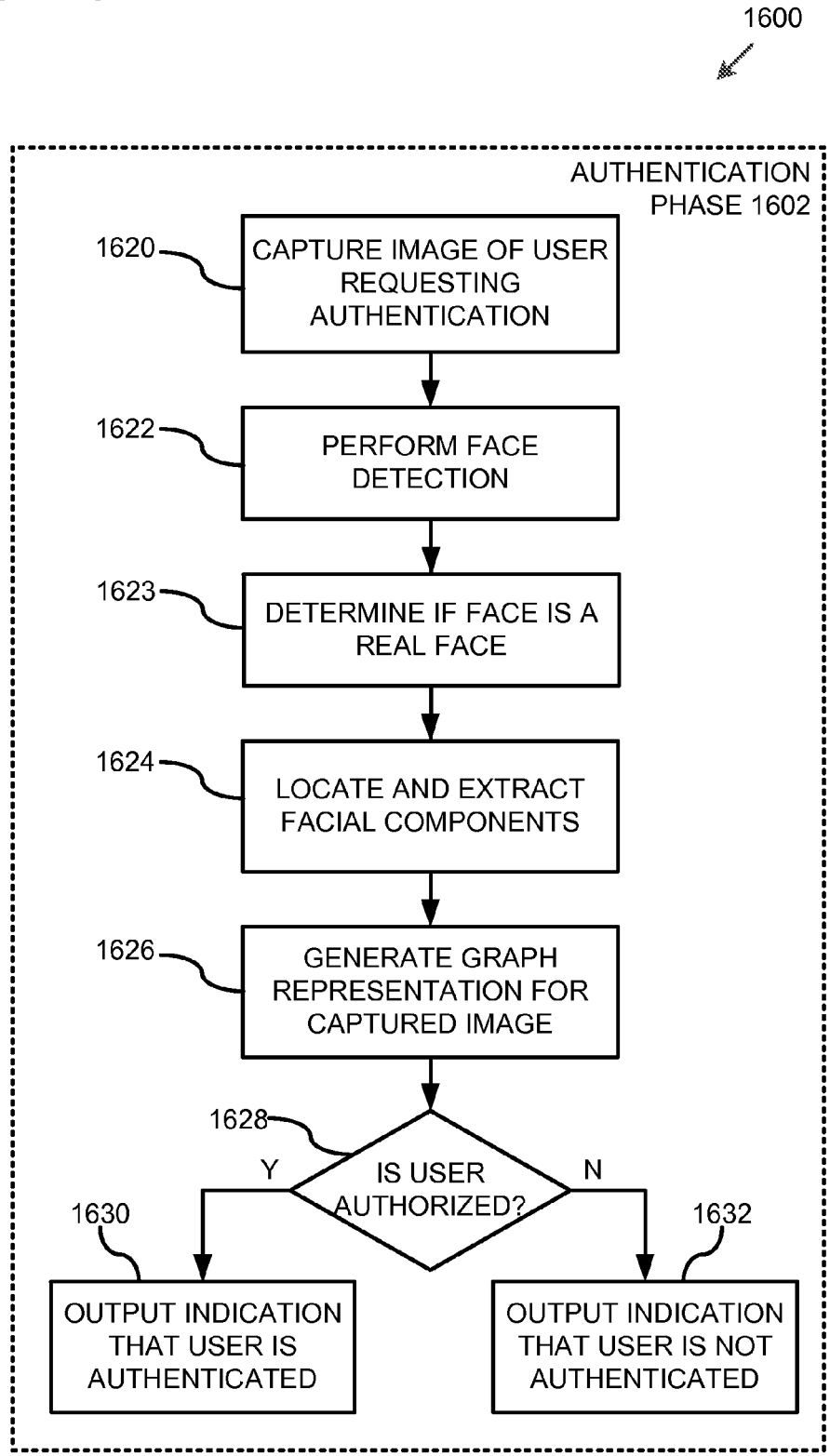
FIG. 16 is a flowchart of an exemplary method for performing facial recognition and authenticating one or more captured images to one or more authentication images using graph-based representations.

FIGS. 15 and 16 are flowcharts illustrating exemplary methods 1500 and 1600 for performing facial recognition for one or more captured images using the graph-based approach. The exemplary methods will be described below in the context of a mobile device, such as a smart phone. It is to be understood, however, that the methods can be applied in other contexts as well and used by any of the computing devices described above. For example, the exemplary facial recognition methods can be performed using an image sensor attached to an entertainment console or television.

The illustrated methods include an enrollment phase 1502 (shown as method 1500 in FIG. 15) that can be performed in advance of a user request to authenticate himself or herself to the mobile device and an authentication phase 1602 (shown as method 1600 in FIG. 16) that can be performed when a user requests authentication to the mobile device. The enrollment phase 1502 can be used to create a graph-based representation or a gallery of graph representations of the authorized user from one or more authentication images. Any of the image capture screens described above with respect to FIGS. 7-10 and 12 can be used to assist in the generation of the authentication images or of the captured images during authentication.

With respect to enrollment phase 1502 of FIG. 15, at 1510, a set of authentication images is captured. In particular implementations, the authentication images are diverse and include the user in different lighting conditions and/or making different expressions. For example, any of the image variations described above with respect to FIG. 11 can be used.

At 1512, facial detection is performed for the captured authentication images. For instance, the facial detection technique described above with respect to method act 1420 and using an implementation of the Viola-Jones facial detector can be used.

At 1514, one or more facial components are detected and localized. For instance, the facial landmark localization technique described above with respect to method act 1422 can be used. In some implementation, the facial component detection technique described in Lin Liang et al., "Face Alignment via Component-Based Discriminative Search," *Proc. of the 10th European Conference on Computer Vision: Part II, ECCV '08*, pp. 72-85 (2008) is used. Although any number of facial components can be used, particular implementations of the disclosed technology use five fiducial points as the most salient components. The five points can be selected as points that produce the "richest appearance" from a low-rank perspective. For instance, the five points can be the right eye, the left, the nose, the right side of the mouth, and the left side of the mouth. In general, selecting a smaller set of facial components (e.g., five or less) can result in a smaller dimension representation of the face, which requires less storage. Such smaller dimension representations may be more suitable for mobile device applications, depending on the available storage capacity of the device.

In certain implementations, each of the points is represented by an intensity vector, which comprises the intensity values of a w×h patch centered by the detected points, $I_c \in \mathbb{R}^{m \times 5}$, where m=w·h and w·h are the patch's width and height, respectively. The subscript c here refers to the component ID; in this example, $c \in [1 \ldots 5]$.

At 1516, a graph representation ($g_g$) of the user's face is constructed from the authentication images from the localized facial components. In certain implementations, the graph representation is generated by concatenating the component instances of a subject i in five different matrices, $D_{ic} = [d_{ic,1}, d_{ic,2}, \ldots, d_{ic,k_i}] \in \mathbb{R}^{m \times k_i}$, where $d_{ic,j}$ is a column vector formed by stacking m raw pixel values for the patch c from the $J^{th}$ training sample, and $k_i$ is the number of the training images of the subject i. The low rank matrix $A_{ic,j}$ can be obtained by solving the following equation:

$$A_{ic,j} = \arg\min \|A_{ic,j}\|_* + \lambda \|E\|_1 \text{ s.t. } d_{ic,j} = A_{ic,j} + E_{ic,j} \quad (1)$$

where the $\|.\|_*$ operator is the nuclear norm and the $\|.\|_1$ operator is the $L_1$ norm. The training set $\mathcal{T} = [A_{ic}], [A_{ic}] = [A_{ic,1}, A_{ic,2}, \ldots, A_{ic,k_i}] \in \mathbb{R}^{m \times k_i}, \forall c \in [1 \ldots 5], \forall i \in [1 \ldots n]$, where n is the number of the authorized persons in the authentication system. The average of the low-rank terms of the facial components are computed using different instance images for every subject in $\mathcal{T}$, as shown in the following equation:

$$\bar{A}_{ic} = \frac{1}{k_i} \sum_{i=1}^{k_i} A_{ic} \quad (2)$$

where $A_i c, \forall c \in [1 \ldots 5]$ represents the average low-rank terms of the five nodes of the reference graph of subject i. In certain embodiments of the disclosed technology, the edges of the graph are represented by the mean distances between the different components of the training image set of the subject i.

$$\bar{d}_{i1} = \frac{1}{k} \sum_{i=1}^{k_i} \|C^i_{re} - C^i_{le}\|_2 \quad (3)$$

$$\bar{d}_{i2} = \frac{1}{k_i} \sum_{i=1}^{k_i} \|C^i_{re} - C^i_{nt}\|_2$$

$$\bar{d}_{i3} = \frac{1}{k_i} \sum_{i=1}^{k_i} \|C^i_{le} - C^i_{nt}\|_2$$

$$\bar{d}_{i4} = \frac{1}{k_i} \sum_{i=1}^{k_i} \|C^i_{rl} - C^i_{nt}\|^2$$

$$\bar{d}_{i5} = \frac{1}{k_i} \sum_{i=1}^{k_i} \|C^i_{ll} - C^i_{nt}\|_2$$

where $C^i_{re}$, $C^i_{le}$, $C^i_{nt}$, $C^i_{rl}$, and $C^i_{ll}$ are the components of the $i^{th}$ subject, which are centered at the right eye, left eye, nose tip, right corner of the lips, and the left corner of the lips, respectively.

During the authentication phase 1602 shown in FIG. 16, an image for a candidate subject is captured at 1620. The image of the candidate subject can be captured using any of the image capture screens described above with respect to FIGS. 7-10.

At 1622, the face in the captured image is detected and, at 1524, the facial components are localized.

At 1623, the face is optionally analyzed to determine whether the face is a real face or a two-dimensional representation of the face. This analysis can be performed using any of the techniques described above with respect to method act 1421.

Face detection 1622 and component localization 1624 can be performed in a manner similar to method acts 1512, 1514 described above with respect to facial detection and components localization in the enrollment phase. However, in certain implementations, the intensity values of the facial components from the captured image are used instead of estimating their corresponding low-rank matrices. Using the intensity values helps improve performance speeds, since the low-rank recovery is computationally expensive.

At 1626, a graph representation ($g_p$) of the captured image is generated. In particular implementations, as the generation of the graph representation is desirably performed quickly, the relatively expensive estimation of the low-rank terms of the facial components is to be avoided. Therefore, the intensity vectors of the graph representation, $I_p \in \mathbb{R}^{m \times 5}$, are used as the graph nodes. The edges of the probe graph are set to the Euclidean distances between the different components.

At 1628, the graph representation is compared to the set of graph representations from the authorized images to determine whether the user is authenticated to the mobile device. If so, then an indication that the user is authenticated is output at 1630; otherwise, an indication that the user is not authenticated is output at 1632. In certain implementations, the graph representation of the captured image and the graph representation from the authentication images are compared using the following equation:

$$d_g = \|W^*(g_p - g_g)\|_2 \quad (3)$$

where W is a weight-vector, which is selected empirically. For example, in certain embodiments, W can be selected based on a training set of images (e.g., using a genetic algorithm). In general, W is selected as a bias factor to the relatively more discriminant nodes or edges in the face. The value $d_g$ is then compared to a threshold value to determine whether the graph representations are sufficiently close to authenticate the user. For example, if the value $d_g$ is less than the threshold, then the user is authenticated at 1630; otherwise the user is not authenticated at 1632.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved. The techniques and solutions described in this application can be used in various combinations to provide an improved user experience with mobile devices, including mobile devices such as smart phones.

Having described and illustrated the principles of our innovations in the detailed description and accompanying drawings, it will be recognized that the various embodiments can be modified in arrangement and detail without departing from such principles. For example, any technologies described herein and used with still photos can be adapted for use with video images. Further, in certain embodiments, additional procedures are implemented in any of the disclosed embodiments to evaluate whether the face in the captured image is a real face (from a human whose image is captured) or a fake face (from a photograph whose image is captured). For instance, the images that are captured can include a first image and a second image, where the second image is captured after the user is prompted to turn his head somewhat or to perform some other gesture (to blink or open his or her mouth). Further, in some embodiments, a 3-D model is created to overcome the possibility of bending the photograph. Other options to help prevent spoofing include prompting the user to make a particular unique expression during image capture (e.g. to blink or to open his or her mouth). Additionally, although many of the disclosed embodiments are described in the context of authenticating a user to a computing device, any of the disclosed techniques can be used to perform subject identification in other contexts (e.g., image tagging).

In view of the many possible embodiments to which the principles of the disclosed technology may be applied, it should be recognized that the illustrated embodiments are only preferred examples and should not be taken as limiting the scope of the disclosure. Rather, the scope of the disclosure is defined by the following claims and their equivalents. We therefore claim all that comes within the scope of these claims and their equivalents.

We claim:

1. One or more computer-readable storage devices storing computer-executable instructions which when executed by a computer cause the computer to perform a method, the method comprising:

receiving an image of a user of a device;

identifying one or more facial descriptors of the user from the received image; and evaluating whether the one or more identified facial descriptors of the user match one or more facial descriptors of a previous user extracted from multiple previously captured images of the previous user, the multiple previously captured images of the previous user being captured under different light sources, at least one image of the previous user being of the previous user illuminated by a low-light source, the evaluating comprising cross verifying the received images against at least one image of a non-user, the cross verifying comprising computing a distance between the received image and the at least one image of a non-user, and determining if the distance between the received image and the at least one image of a non-user is greater than a non-user image threshold value.

2. The one or more computer-readable storage devices of claim 1, wherein the method further comprises generating an indication that the user in the received image is an authorized user or is not the authorized user based at least in part on the evaluation.

3. The one or more computer-readable storage devices of claim 1, wherein the method further comprises finding that the one or more facial descriptors of the user in the received image match the one or more facial descriptors of the previous user if a smallest difference between the facial descriptors of the user in the received image and the facial descriptors of the previous user from the multiple images of the previous user satisfies a threshold value.

4. The one or more computer-readable storage devices of claim 1, wherein the evaluating further comprises evaluating whether the one or more identified facial descriptors of the user match one or more facial descriptors of multiple other previous users.

5. The one or more computer-readable storage devices of claim 1, wherein a first of the facial descriptors is weighted higher than a second of the facial descriptors.

6. The one or more computer-readable storage devices of claim 1, wherein the method further comprises finding that the one or more facial descriptors of the user in the received image match the one or more facial descriptors of the previous user if a smallest difference between the facial descriptors of the user in the received image and the facial descriptors of the previous user from the multiple images of the previous user satisfies a first threshold value, and if a ratio between the smallest distance and a greatest distance between the facial descriptors of the user in the received image and the facial descriptors of the previous user in the multiple images of the previous user satisfies a second threshold value.

7. The one or more computer-readable storage devices of claim 1, wherein two or more images of the user of the device are received, and wherein the method further comprises:

computing an average of the one or more facial descriptors from the two or more images of the user; and finding that the one or more facial descriptors of the user match the one or more facial descriptors of the previous user if a difference between the average of the one or more facial descriptors and the facial descriptors of the previous user in at least one of the multiple images of the previous user satisfies a threshold value.

8. One or more computer-readable storage devices storing computer-executable instructions which when executed by a computer cause the computer to perform a method, the method comprising:
receiving an image of a user of a device;
identifying one or more facial descriptors of the user from the received image; and
evaluating whether the one or more identified facial descriptors of the user match one or more facial descriptors of an authorized user extracted from a plurality of images of the authorized user, the plurality of images of the authorized user being captured under different light sources, at least one image of the authorized user being of the previous user illuminated by a low-light source,
wherein the evaluating comprises cross verifying the received images against at least one image of a non-user, and
wherein the method further comprises finding that the one or more facial descriptors of the user in the received image match the one or more facial descriptors of the authorized user if (a) a difference between the facial descriptors of the user in the received image and the facial descriptors of the authorized user from the plurality of images of the authorized user satisfies a first threshold value, and (b) the number of images in the plurality of images satisfies a second threshold.

9. The one or more computer-readable storage devices of claim 8, wherein the method further comprises generating an indication that the user in the received image is an authorized user or is not the authorized user based at least in part on the evaluation.

10. The one or more computer-readable storage devices of claim 8, wherein a first of the facial descriptors is weighted higher than a second of the facial descriptors.

11. A computing device having a processor and memory, the computing device being configured to perform operations comprising:
receiving an image of a user of the device;
identifying one or more facial descriptors of the user from the received image; and
evaluating whether the one or more identified facial descriptors of the user match one or more facial descriptors of a previous user extracted from multiple previously captured images of the previous user,
the multiple previously captured images of the previous user being captured under different light sources, at least one image of the previous user being of the previous user illuminated by a low-light source,
the evaluating comprising cross verifying the received images against at least one image of a non-user, the cross verifying comprising computing a distance between the received image and the at least one image of a non-user, and determining if the distance between the received image and the at least one image of a non-user is greater than a non-user image threshold value.

12. The computing device of claim 11 further configured to perform the operation of generating an indication that the user in the received image is an authorized user or is not the authorized user based at least in part on the evaluation.

13. The computing device of claim 11 further configured to perform the operation of finding that the one or more facial descriptors of the user in the received image match the one or more facial descriptors of the previous user if a smallest difference between the facial descriptors of the user in the received image and the facial descriptors of the previous user from the multiple images of the previous user satisfies a threshold value.

14. The computing device of claim 11, wherein the evaluating further comprises evaluating whether the one or more identified facial descriptors of the user match one or more facial descriptors of multiple other previous users.

15. The computing device of claim 11, wherein a first of the facial descriptors is weighted higher than a second of the facial descriptors.

16. The computing device of claim 11 further configured to perform the operation of finding that the one or more facial descriptors of the user in the received image match the one or more facial descriptors of the previous user if a smallest difference between the facial descriptors of the user in the received image and the facial descriptors of the previous user from the multiple images of the previous user satisfies a first threshold value, and if a ratio between the smallest distance and a greatest distance between the facial descriptors of the user in the received image and the facial descriptors of the previous user in the multiple images of the previous user satisfies a second threshold value.

17. The computing device of claim 11, wherein two or more images of the user of the device are received, and wherein the device is configured to perform the further operations of:
computing an average of the one or more facial descriptors from the two or more images of the user; and
finding that the one or more facial descriptors of the user match the one or more facial descriptors of the previous user if a difference between the average of the one or more facial descriptors and the facial descriptors of the previous user in at least one of the multiple images of the previous user satisfies a threshold value.

18. A computing device having a processor and memory, the computing device being configured to perform operations comprising:
receiving an image of a user of the device;
identifying one or more facial descriptors of the user from the received image;
evaluating whether the one or more identified facial descriptors of the user match one or more facial descriptors of an authorized user extracted from a plurality of images of the authorized user, the plurality of images of the authorized user being captured under different light sources, at least one image of the authorized user being of the previous user illuminated by a low-light source, wherein the evaluating comprises cross verifying the received images against at least one image of a non-user; and
finding that the one or more facial descriptors of the user in the received image match the one or more facial descriptors of the authorized user if (a) a difference between the facial descriptors of the user in the received image and the facial descriptors of the authorized user from the plurality of images of the authorized user satisfies a first threshold value, and (b) the number of images in the plurality of images satisfies a second threshold.

19. The computing device of claim 18 further configured to perform the operation of generating an indication that the user in the received image is an authorized user or is not the authorized user based at least in part on the evaluation.

20. The computing device of claim 18, wherein a first of the facial descriptors is weighted higher than a second of the facial descriptors.

* * * * *